(12) United States Patent
Pavero

(10) Patent No.: US 8,534,189 B2
(45) Date of Patent: Sep. 17, 2013

(54) DEVICE FOR MAKING CHEESE, OTHER MILK-DERIVATIVES AND TOFU

(75) Inventor: Riccardo Pavero, Ortonovo (IT)

(73) Assignee: Riccardo Pavero, Ortonovo (IT)

( * ) Notice: Subject to any disclaimer, the term of this patent is extended or adjusted under 35 U.S.C. 154(b) by 495 days.

(21) Appl. No.: 12/741,094

(22) PCT Filed: Nov. 24, 2008

(86) PCT No.: PCT/IB2008/003190
§ 371 (c)(1),
(2), (4) Date: May 17, 2010

(87) PCT Pub. No.: WO2009/066168
PCT Pub. Date: May 28, 2009

(65) Prior Publication Data
US 2010/0263551 A1    Oct. 21, 2010

(30) Foreign Application Priority Data
Nov. 22, 2007 (IT) .................................. PI07A0132

(51) Int. Cl.
*A23L 1/20*    (2006.01)
*A47J 43/044*    (2006.01)
*B01F 7/20*    (2006.01)
*A23C 3/02*    (2006.01)

(52) U.S. Cl.
USPC .................. 99/456; 99/348; 99/453; 99/495

(58) Field of Classification Search
USPC ................. 99/348, 349, 353, 352, 452, 453, 99/456, 495
See application file for complete search history.

(56) References Cited

U.S. PATENT DOCUMENTS

| | | | |
|---|---|---|---|
| 996,832 A * | 7/1911 | Campbell | 426/471 |
| 3,606,683 A * | 9/1971 | Joux et al. | 426/491 |
| 4,802,407 A | 2/1989 | Negri et al. | |
| 4,869,164 A | 9/1989 | Takeyama | |
| 5,701,810 A | 12/1997 | Nakai | |
| 6,792,849 B1 | 9/2004 | Kim | |
| 6,796,220 B2 * | 9/2004 | Lee | 99/348 |
| 6,942,888 B2 * | 9/2005 | Mueller | 426/516 |

FOREIGN PATENT DOCUMENTS

| | | |
|---|---|---|
| DE | 3002058 | 7/1980 |
| DE | 3643135 | 6/1988 |

* cited by examiner

*Primary Examiner* — Reginald L Alexander
(74) *Attorney, Agent, or Firm* — Ladas & Parry, LLP

(57) ABSTRACT

Compact machine for making cheese, other milk-derivatives and tofu comprising a shell (1) in which an impermeable basin (3) is inserted, a collecting container (2) in which a permeable basket (6) is inserted for collecting the product and a support structure comprising a lower base member (10) having two side arms (8). The machine comprises, furthermore, a motor (7) integral to the shell (1) for operating a stirring member (5), and heating means (4) adapted to heat to various temperature the content of the basin (3). The basin (3) and the permeable basket (6) are open and coupled with respect to each other, in a releasable way, one against the another. The coupled basin (3) and the permeable basket (6) are adapted to be integrally rotated, in order to be moved alternatively between a first position (A), where the basin (3) is down and the basket (6) is up, and a second position, where the basket (6) is down and the basin (3) is up. The cheese can be extracted from the basket (6) after a plurality of preparation steps.

21 Claims, 19 Drawing Sheets

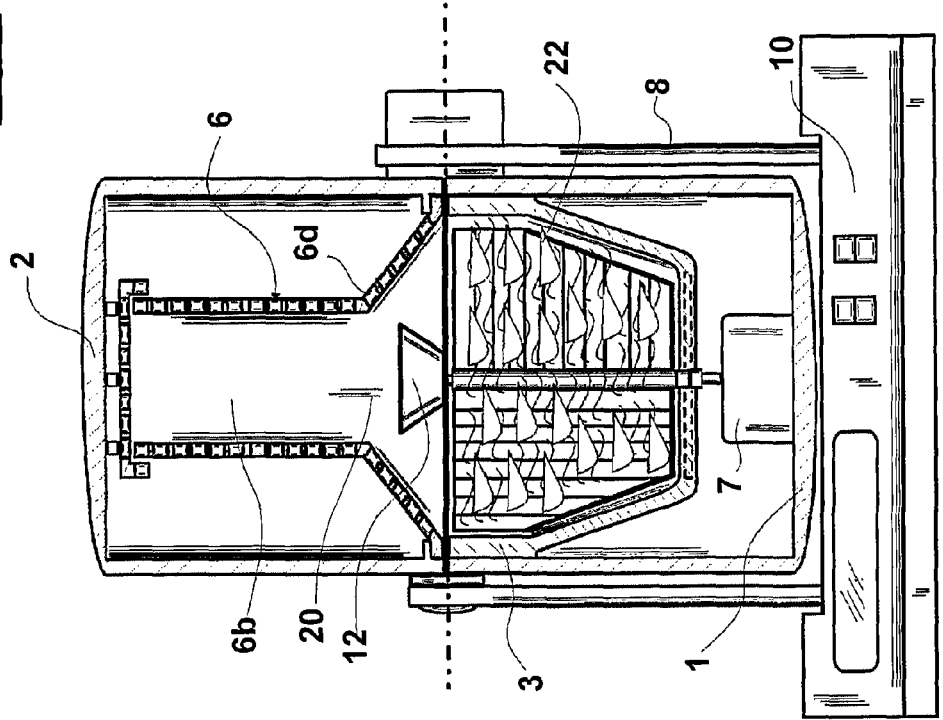
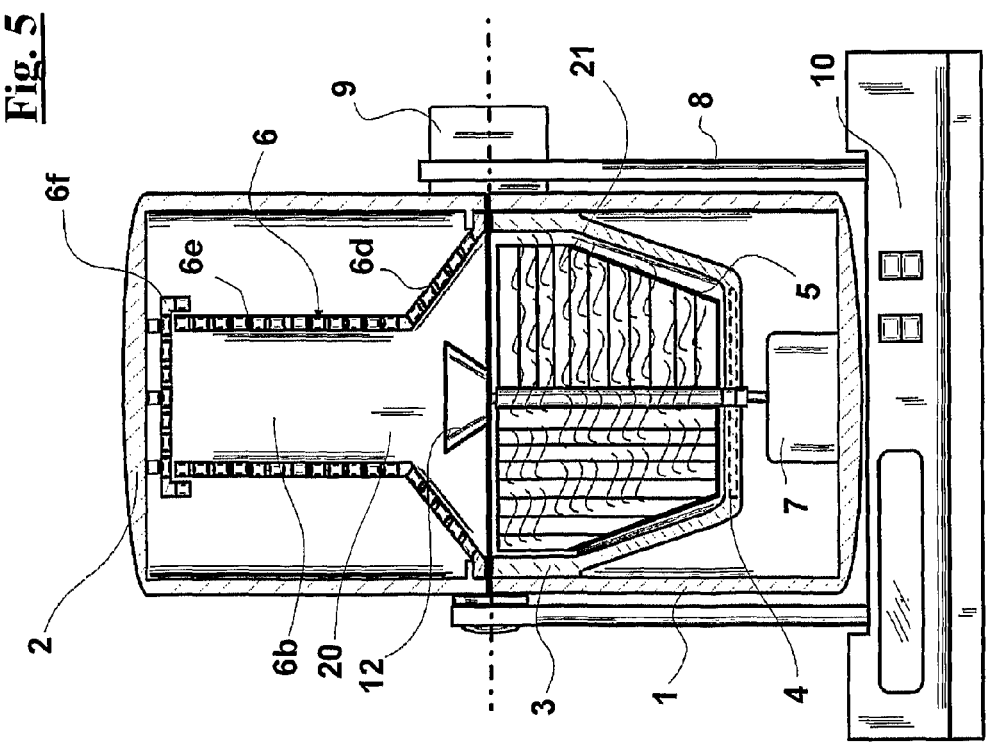

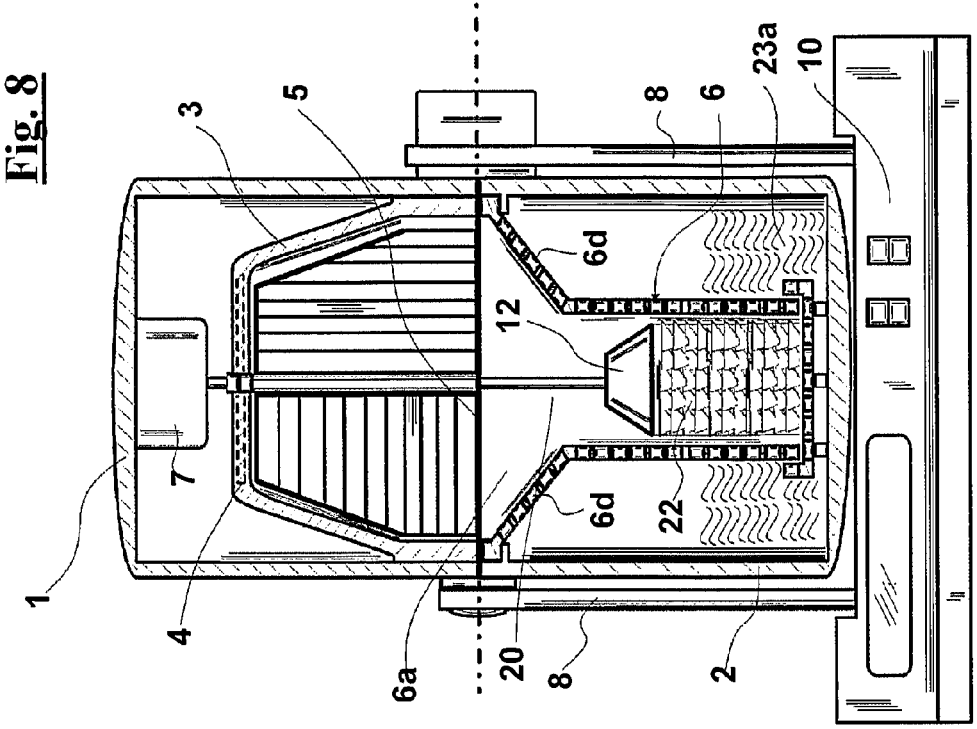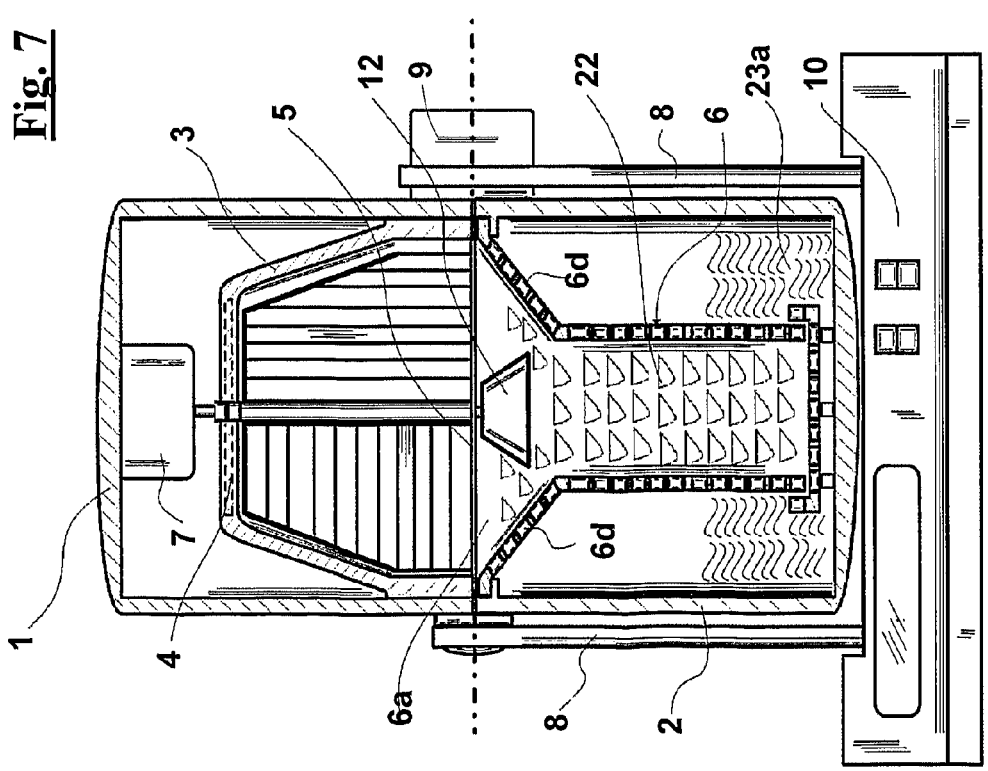

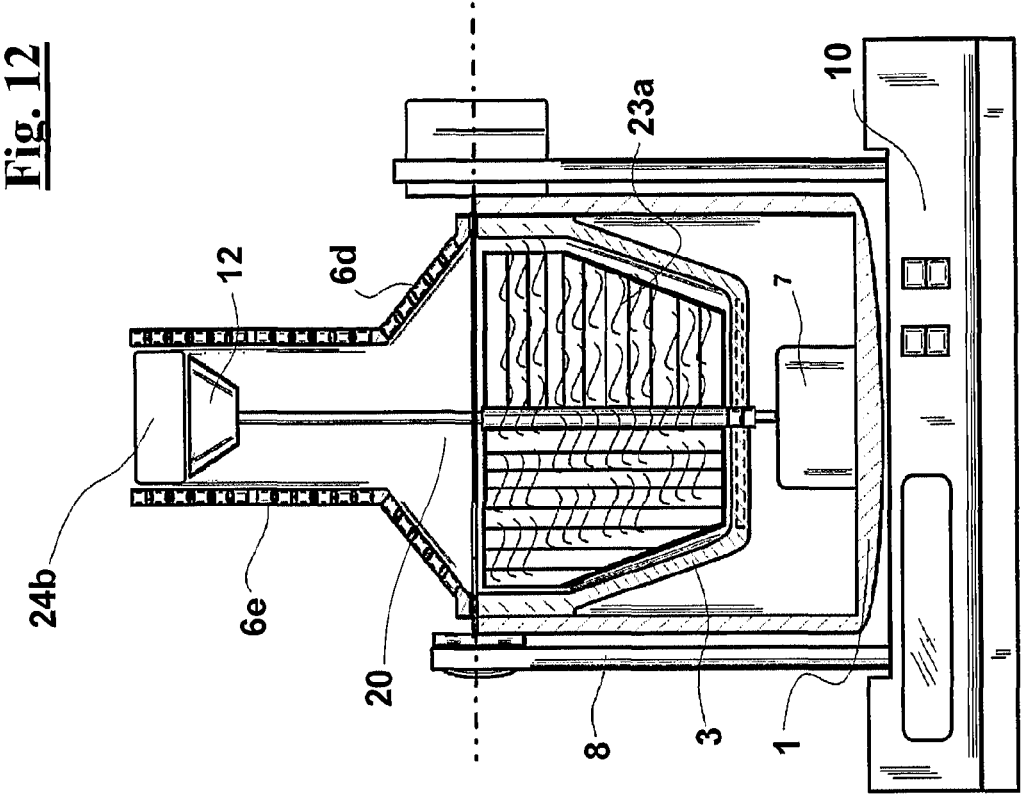
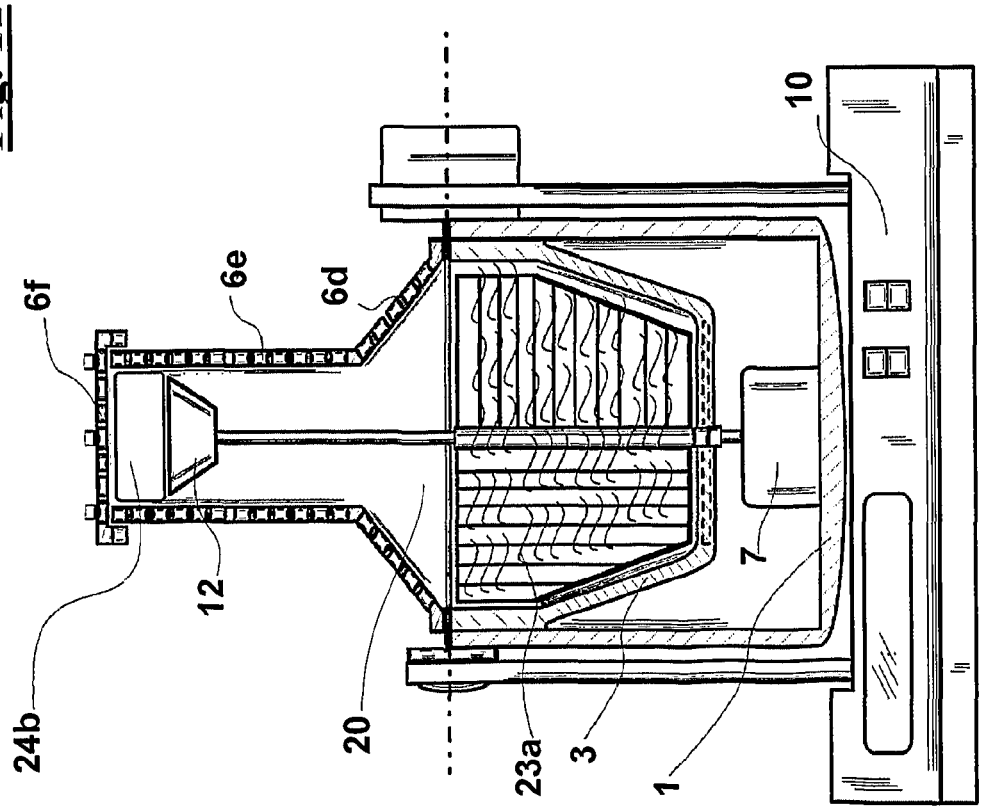

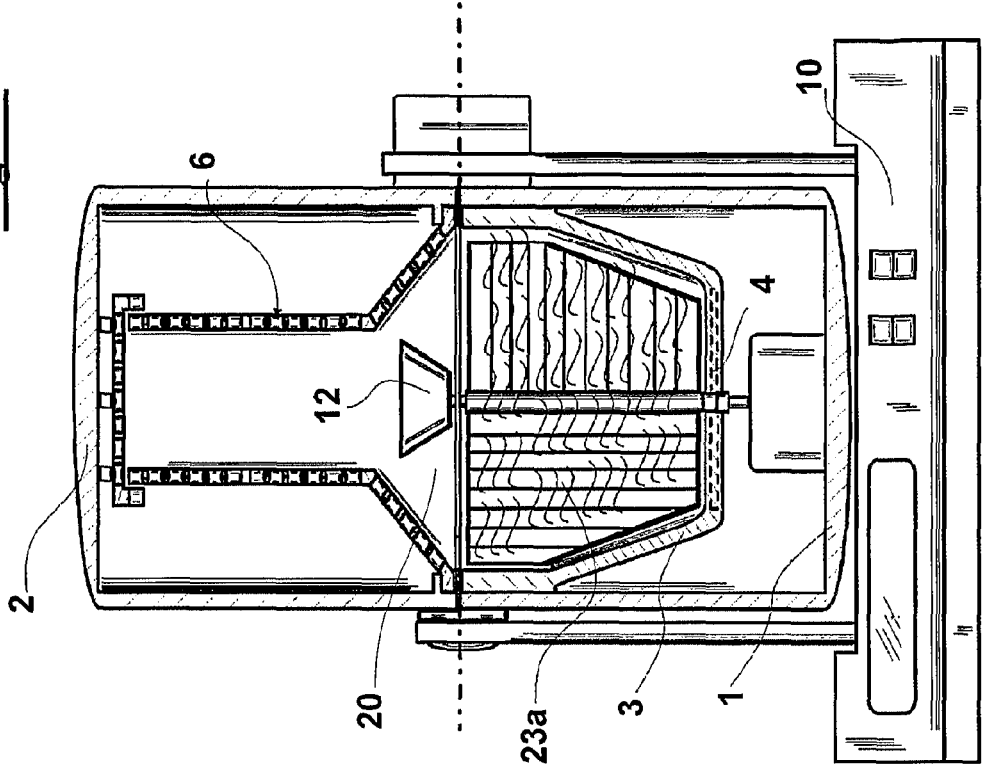
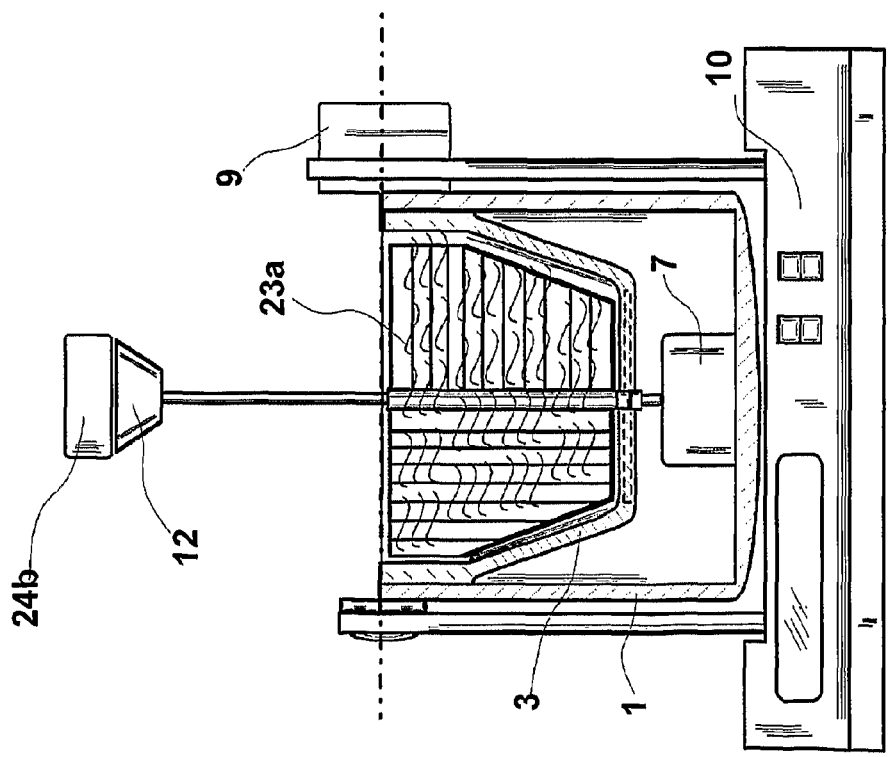

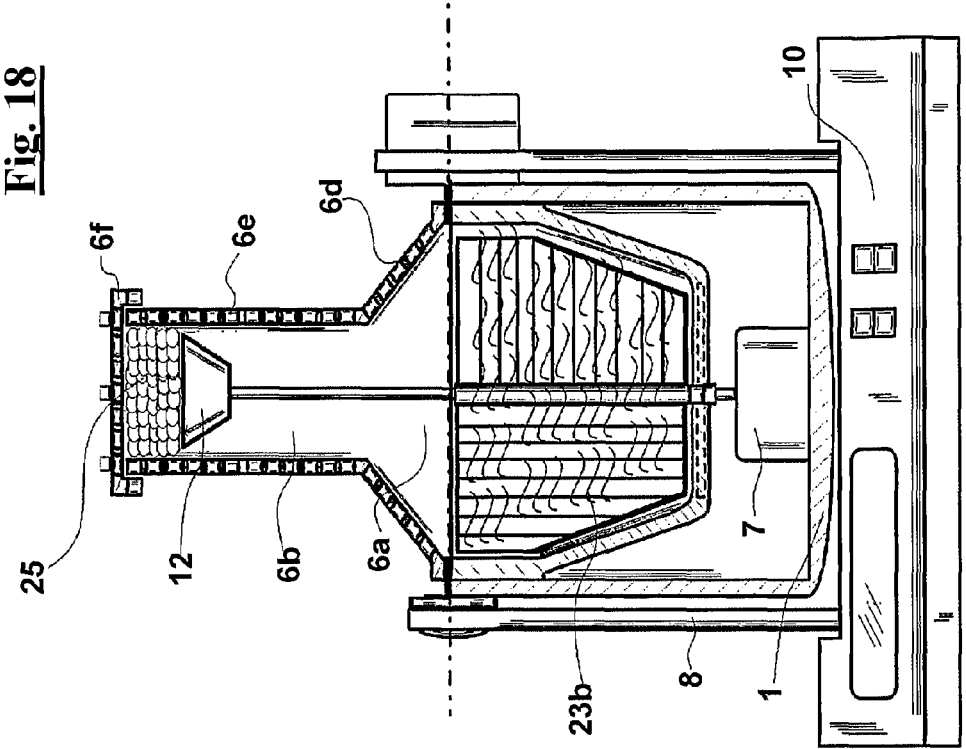
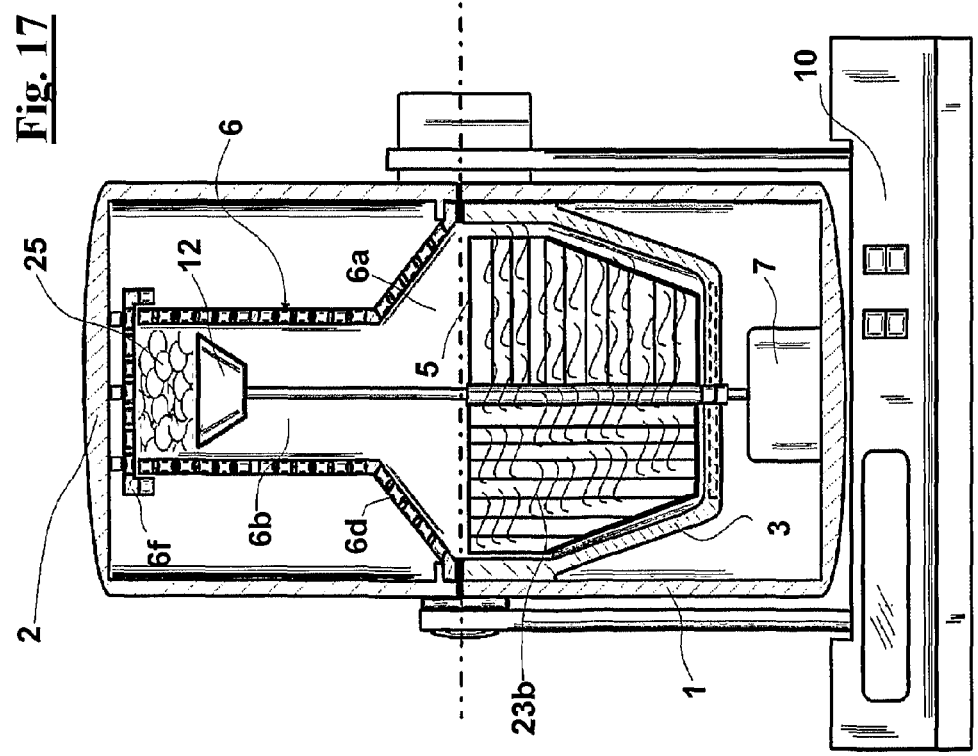

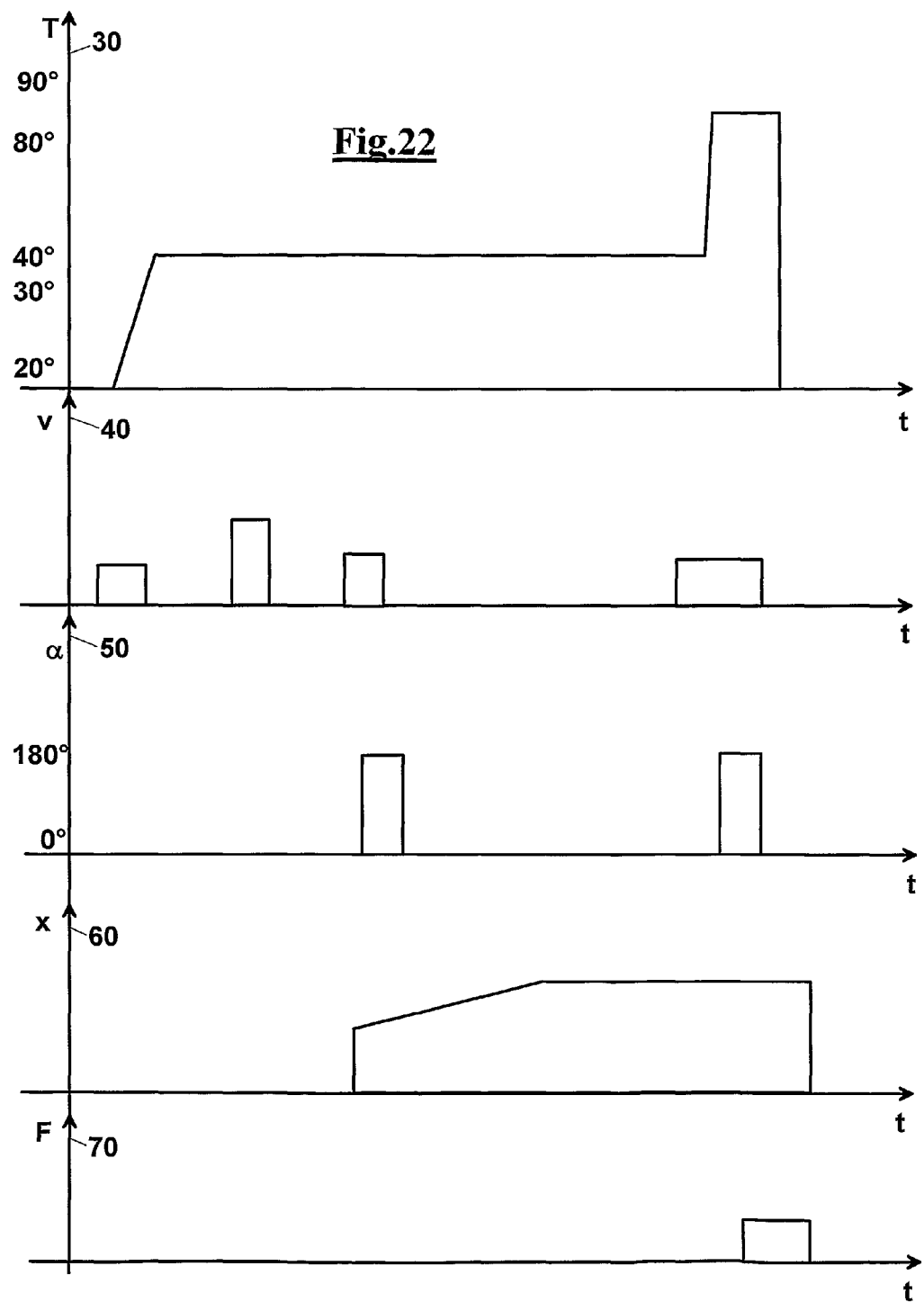

Fig.23
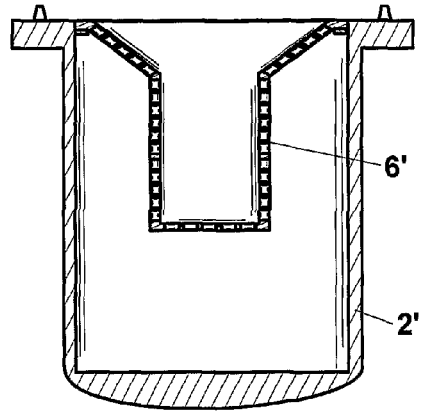
Fig.24
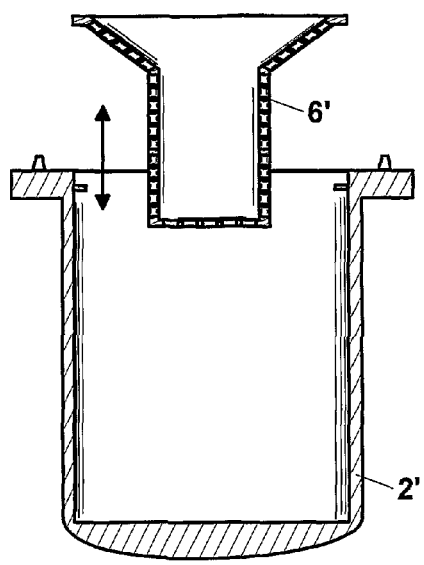
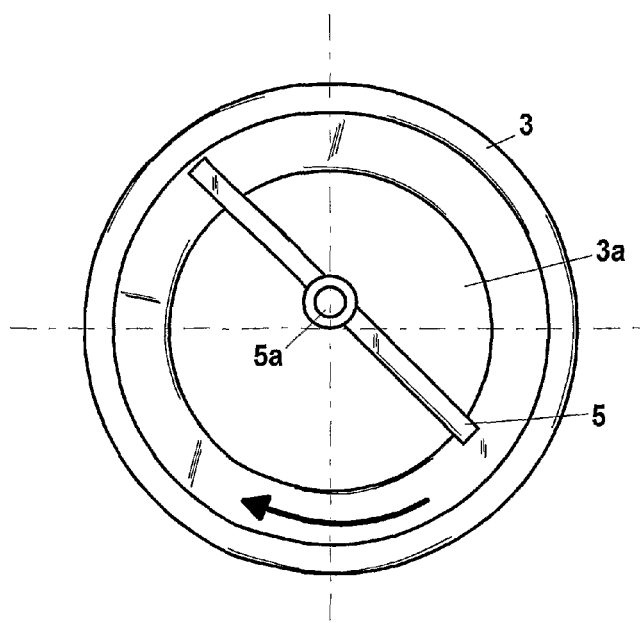
Fig.25

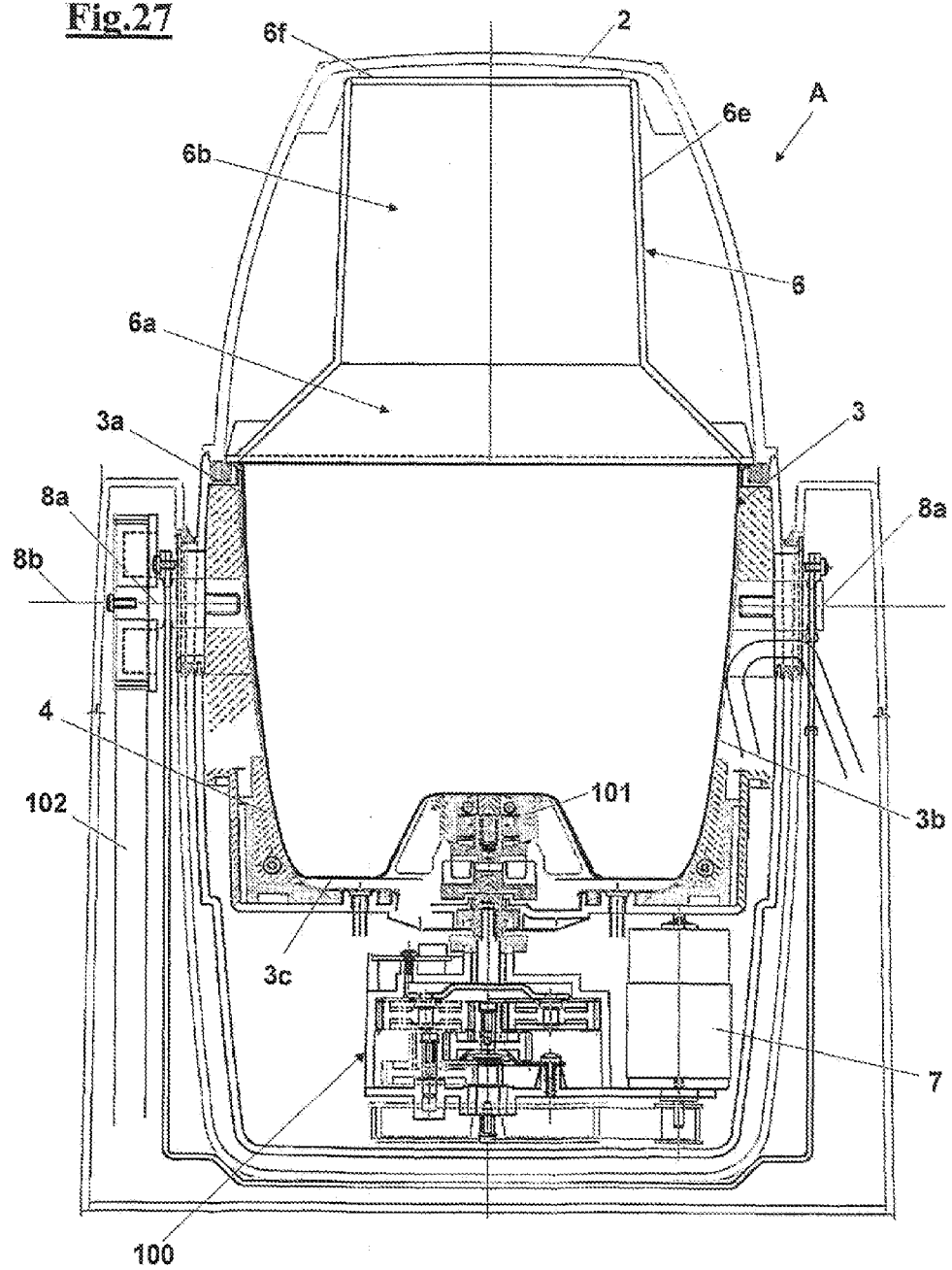

DEVICE FOR MAKING CHEESE, OTHER MILK-DERIVATIVES AND TOFU

FIELD OF THE INVENTION

This invention relates to the food field and, in particular, it describes a compact machine for making cheese, other milk-derivatives and tofu, by using processes like to those adopted in dairies and food industries.

DESCRIPTION OF THE TECHNICAL PROBLEM

The production of cheese or other milk-derivatives requires a number of steps, which are common for most of the products of this field.

In a typical process, the milk, after a possible preliminary treatment, is heated and mixed first with selected bacterial cultures, that are peculiar is for each type of product, and then with rennet, which is an enzymatic material, normally a raw proteolytic enzyme of animal origin.

The enzymatic activity of the rennet causes coagulation of the milk making a solid gel, or curd, that, with special tools, is shredded ("cutting" or "milling" step) to allow the expulsion of whey.

After cutting the curd a stay time can follow ("rest") and/or a further heating step ("cooking") can be carried out. Then, the curd that has been already separated from the whey is put in special containers ("molds"), which provide the shape to the final product. A step follows, called "drying-out", during which the semifinished product is kept in special warm places ("warm chambers") to assist the fermentative activity of the bacterial cultures that had been previously added to the milk. The fermentative activity causes, among other effects, the transformation of the lactose present in the milk into lactic acid. This acidification causes the semifinished product to continue to loose whey ("syneresis"). Simultaneously, the semifinished product can be pressed for improving its firmness. Then, the step of salting is carried out, which can, however, also be preceded by a step of "ripening" that can be a step of aging.

The whey that has been obtained is, normally, used again to obtain a fresh cheese, like ricotta. In this case the whey, which is stirred, is heated up to 80-90° C., up to coagulation and to floating the "flakes" of ricotta, with further separation of a light whey.

In case of "pasta filata" cheese (for example mozzarella), certain different steps are provided with respect to the above described technique.

In a typical process, the milk is heated up to about 35° C., then inoculated with selected bacterial cultures, and then left to stay for some minutes. At this point, rennet is added and then, after coagulation, the curd is shredded into small parts ("milling") and its drainage is obtained, total or partial, from the whey. Then, a stop at about 40° C., so called "drying out", is effected during which the curd is acidified by the inoculated bacterial cultures. In some cases, said acidification is not obtained by fermentation operated by the inoculated bacterial cultures, but with direct addition of citric acid. The successive step consist of an immersion of the curd in the boiling whey or water (80-90° C.). Then, a kneading step called "stretching" that can be manual or mechanical is carried out. Eventually, once formed, the product is cooled in cold water.

Concerning butter, finally, a typical production process can be the following:
inoculation of cream with particular bacterial cultures;
stay at a temperature of about 20° C., with subsequent microbial proliferation and acidification of the product ("drying-out");
quick cooling of the product up to about 6° C. ("crystallization");
energetic stirring of the product at low temperature, up to thickening the fat component (butter) that is separated from a lean whey ("churning").

The above described steps are normally carried out in the industrial or craft fields, where wide working spaces, with differentiated production and with special machines, are required. These machines cannot be used for a household production. Even the craft workshops of smaller size, however, use containers and pieces of equipment that are not adapted to a household production.

SUMMARY OF THE INVENTION

It is therefore object of the present invention to provide a compact machine for making cheese, other milk-derivatives and tofu that is of relatively limited size in particular for household use.

It is another object of the present invention to provide a compact machine for making cheese, other milk-derivatives and tofu that carries out a succession of dairy operations to prepare even a single piece of cheese, other milk derivative or tofu.

It is also an object of the present invention to provide a compact machine for making cheese, other milk-derivatives and tofu that is functional, reliable and with a good aesthetic structure.

It is also an object of the present invention to provide a compact machine for making cheese, other milk-derivatives and tofu that is structurally easy in its main components.

It is further object of the present invention to provide a compact machine for making cheese, other milk-derivatives and tofu in the shape of a small household appliance for a widespread use and production.

It is still an object of the present invention to provide a compact machine for making cheese, other milk-derivatives and tofu with multifunctional operativity, to provide compact cheese, pasta filata cheese, cheese flakes, soft cheese as well as ricotta, butter and tofu.

These and other objects are achieved by a compact machine for making cheese, other milk-derivatives and tofu comprising:
a first and a second open container that are coupled to each other in a releasable way against each other to define a treatment chamber, wherein:
said first container comprises an impermeable basin having a bottom wall and a side wall that define together a workspace, as well as a stirring means acting in said workspace and a heating means that is adapted to heat said bottom wall and/or said wall;
said second container comprises a permeable basket having at least one conical surface that is adapted to convey into said basket a product coming from said basin.

In particular, said coupled first and second container are adapted to be integrally rotated, in order to be moved alternatively between a first position, where said basin is down and said basket is up, and a second position, where said basket is down and said basin is up.

Preferably, said basket has a funnel-shaped end portion.

Advantageously, a whey collecting container is provided for collecting whey expelled from the product and filtered through said permeable basket when said coupled first and second container are in said second position, said collecting container being integral to the second container and allowing the whey to fall back into the first container when said coupled first and second container turn back to said first position.

This way, it is possible to make the cheese by putting the milk, the bacterial cultures and the rennet in said first container, and closing above the second container, maintaining at first the set of the two containers in the first position. Then, a step is provided of mixing with said stirring means and heating with said heating means, up to a temperature, according to the type of cheese that has to be produced, of about 30°-40° C. The stirring means are then stopped for some minutes up to the formation of the curd. Then, the stirring means are operated again in order to chop the curd. After that, said coupled first and second container are integrally rotated to said second position, so that the product in work, consisting of the chopped curd, falls into said second container and, in particular, is guided by said conical surface, in particular funnel-shaped, into said permeable basket.

The collecting container, which can be integral to the second container, gathers the whey expelled and filtered through the permeable basket from the product in work, consisting of the shredded curd that progressively is compacted within the basket by its own weight. The heating means, are then operated again for a determined time, according to the type of cheese, for keeping at about 30° C. the inner temperature of the chamber consisting of the two containers, carrying out the so-called "drying-out" step. Before starting the drying-out, the curd is preferably pressed, by hand or with a special automatic device described hereinafter.

At the end of the drying-out step, after opening the containers, it is possible to extract the cheese, which can be pressed either separately, or while it is still in the basket, for eliminating possible empty spaces remaining inside. Then, once removed the cheese, it is possible to close again the two containers.

In case of production of ricotta, after turning on again the stirring means, the heating means heats the whey to about 80-90°, and then coagulation occurs of the whey-proteins and eventually the production of ricotta that is separated from a light whey.

After that, the united first and second container are again integrally rotated to said second position, so that the product consisting of ricotta and light whey falls into said second container and, in particular, it is guided by said funnel-shaped edge into said permeable basket. The collecting container receives light whey expelled from the ricotta and filtered through the permeable basket. The ricotta remains in the basket and is compacted for being drawn after opening the two containers. Light whey is drawn for being eliminated or reused, and the machine is ready, after washing, for carrying out a new production cycle.

Advantageously, a means is provided for pressing the product in said first container by extending from said first container up to engaging said basket when said first and second containers are in the second position. This way, it is possible to return in said first position said first and second containers, without opening them until said first position is not achieved again. In this case the product is supported by said pressing means, while the whey has already fallen into the basin of the first container. By raising the second container, the cheese or the ricotta is ready for being drawn by the pressing means. In particular, the pressing means can extend from the same shaft about which said stirring member is made, and occupy in part said second container, in the funnel-shaped zone of the same and without blocking said basket.

In particular, said pressing means has a conical head, with a flat base member that is oriented towards said basket. This way, when turning from the first to the second position the product slides both against said funnel-shaped end portion, and against the conical walls of the pressing means, thus reaching said basket. Then, the pressing member is lowered into said basket by elongating said shaft, for example by means of telescopic coupling or screw, causing the flat base member to engage against the product in the basket.

The flat base member is used then also as a support for supporting the cheese or its derivatives when, at the end of the production cycle, the two containers have been moved back to said first position and the second container is open for extraction of the final product, or other operations are carried out.

Another possible embodiment of the process that can be carried out through said machine, in particular relates to the production of pasta filata cheese, for example mozzarella. The succession of productive steps starts arranging the ingredients in said first container and, in particular, according to a possible recipe, milk, cream, citric acid and rennet. Then, said stirring means are operated for several minutes, for mixing suitably the components. Then, said stirring means stop and the heating means is activated that heat the content of the basin to about 35° C. After about fifteen minutes, the stirring means is operated again in order to chop the curd (so called "milling" step).

Then, said first and second containers, coupled to each other, are integrally rotated up to said second position. The shredded curd falls in said second container, guided by said funnel-shaped end portion into said permeable basket. Several minutes later, said first and second containers, coupled to each other, are integrally rotated back to said first position. This way, the whey has been collected in the basin of said first container, whereas the curd is compacted by said pressing means, in is said basket. Then, said heating means is activated that bring the whey to the temperature of about 80-90° C. At this point, said first and second containers, coupled to each other, are integrally rotated, up to said second position, in order to submerge the curd with the hot whey. Then, said first and second containers are again rotated, up to said first position. At this point, said second container can be removed by the user, which draws the curd for working it ("stretching" phase), thus obtaining the final product. Alternatively, said stretching step can be carried out by of stretching pins that are arranged on the pressing member and on the bottom of said basket.

Advantageously, the curd worked can be inserted again in the machine that carries out a new tilting step, to submerge a second time the curd with the hot whey. These "sinking" of the curd in the hot whey can be repeated different times, up to achieve a desired consistency.

Another type of process that can be carried out by said machine relates to the production of butter. The first step consists of introducing cream and a special bacterial inoculation in said first container. Then, said stirring means are operated, for mixing suitably the content, and said heating means are turned on to heat at about 30° C.

Then, once achieved a good ripening of the cream, said heating means are turned off, and the product is cooled quickly. This cooling step can be obtained by pouring directly cold water into the machine, after removal of said second container, or through an equipment, belonging to the machine, comprising a reservoir of cold water and an injecting device for the water.

Then, the speed is increased of said stirring means and tilting is repeated of said first and second containers alternatively from said first position A to said second position B in order to obtain a beating of the product (step of "butter making").

Advantageously, said pressing means are selected from the group comprised of: a plane surface disc or a concave surface disc oriented towards said basket.

With reference to the stretching pins above cited, in the production of pasta filata cheese, said disc rotates about its own axis at a predetermined speed and has on said plane surface or said concave surface one or more pins that are adapted to be coupled, when said pressing element extends towards said basket, with one or more pins mounted on the bottom of said basket in order to form a stretching space through which the product passes and is stretched.

Advantageously, a permeable basket is provided that can be removed and replaced with another basket that has a different shape when needed according to a desired product.

For example said basket can be made in different ways with respective mesh sizes and shapes to achieve a desired filtering rate of the product that crosses it. In particular, the walls of the basket may have a specific pattern that is adapted to give the cheese a desired final aspect. For example, in case of making mozzarella, in order to achieve the typical round shape, both the bottom of the basket and the pressing member can correspondingly be concave, in order to define between them a space having such shape.

Furthermore, said stirring means may have profiles and shapes that are variable depending upon different operations to carry out in the different working steps and/or for various types of product.

For example, a curd breaker can be provided with "lyre-like" shape with movable portions that, according to the rotation direction, have respectively a cutting or a mixing function.

Normally, the machine according to the invention may have Advantageously, a set of stirring means having a snap fit connection in order to be inserted and/or replaced quickly, according to the various functions such as curd breakers, mixers, stirrers, stretchers, etc.

Preferably, a support structure is provided of the two coupled containers comprising a plane base member having two side arms. Said arms, in particular, are arranged at opposite sides with respect to said coupled containers, in order to support them during rotation.

Advantageously, said arms are associated with a motor that drives automatically the rotation of the two coupled containers. For example, the motor can be provided on the base member frame, connected by transmission means to the containers. Alternatively, the motor for rotating the containers rotates integrally to the two containers when turning from the first to the second position.

Advantageously, the first container is enclosed in a shell that contains inside the stirring motor. In this case the stirring motor rotates integrally to the two containers when turning from the first to the second position.

The stirring motor can also be fixed on the base member out of the shell and/or the first container. In this case, a snap fit clutch means is provided for quick connection with a transmission element of the movement to the stirring member, which are coupled to each other when the two containers are in the first position.

The stirring member and the relative motor are arranged in order to rotate selectively in two opposite rotation directions, the stirring member having, in particular, blades that have a cutting profile in one of the two rotation directions and a mixer-like profile in the other one of the two rotation directions. Therefore, when the stirring member rotates in one direction the blades present the mixing profile, and this is used in the starting step when the rennet and the bacterial cultures have to be mixed in the milk, whereas when the stirring member rotates in the other direction the blades offer the cutting profile, when the curd is cut into small parts.

In a preferred exemplary embodiment said machine has a digital display that displays, in particular, the type of program that has been selected or the type of product to make as well as the operations that the user must follow in the various working steps.

The machine can also have an alarm means that warns the user when it is needed to introduce the coagulating substances, such as rennet or citric acid.

In particular, said machine, can, furthermore, have monitoring sensors that measure physical quantities such as temperature, speed of the stirring means, pH and pressure in said machine, in order to provide a desired succession of operative steps.

In a preferred exemplary embodiment the machine has means for directly adding rennet, bacterial inoculation or other ingredients useful for the production in the first container; said means comprising capsules that contain, in a separated or premixed way, such ingredients to put in the milk at a selected step. For example, a capsule can contain rennet or citric acid to be added in the basin after a predetermined time, without opening the two containers.

Advantageously, a fastening member can be provided on the machine for a connection to a tap, assisting the introduction of cold water into the machine same.

Preferably, said machine has vibration means powered by one of said motors, which assists the descent of the curd from said basin into said permeable basket and assists a first compaction.

Concerning tofu, the operation of the machine is similar to the production process for compact cheese, using soy milk and appropriate coagulating substances.

Advantageously, said machine for making cheese, other milk-derivatives and tofu, can be multifunctional and used, for example, also for making yoghurt, bread, jam, pasta etc. In this case, the first container can be used for mixing, heating and/or cooking the ingredients for the many products, and the second container can be used as cover, for keeping the temperature, or for collecting the final product.

BRIEF DESCRIPTION OF THE DRAWINGS

The invention will be made clearer with the following description of an exemplary embodiment thereof, exemplifying but not limitative, with reference to the attached drawings wherein.

Figure 1:
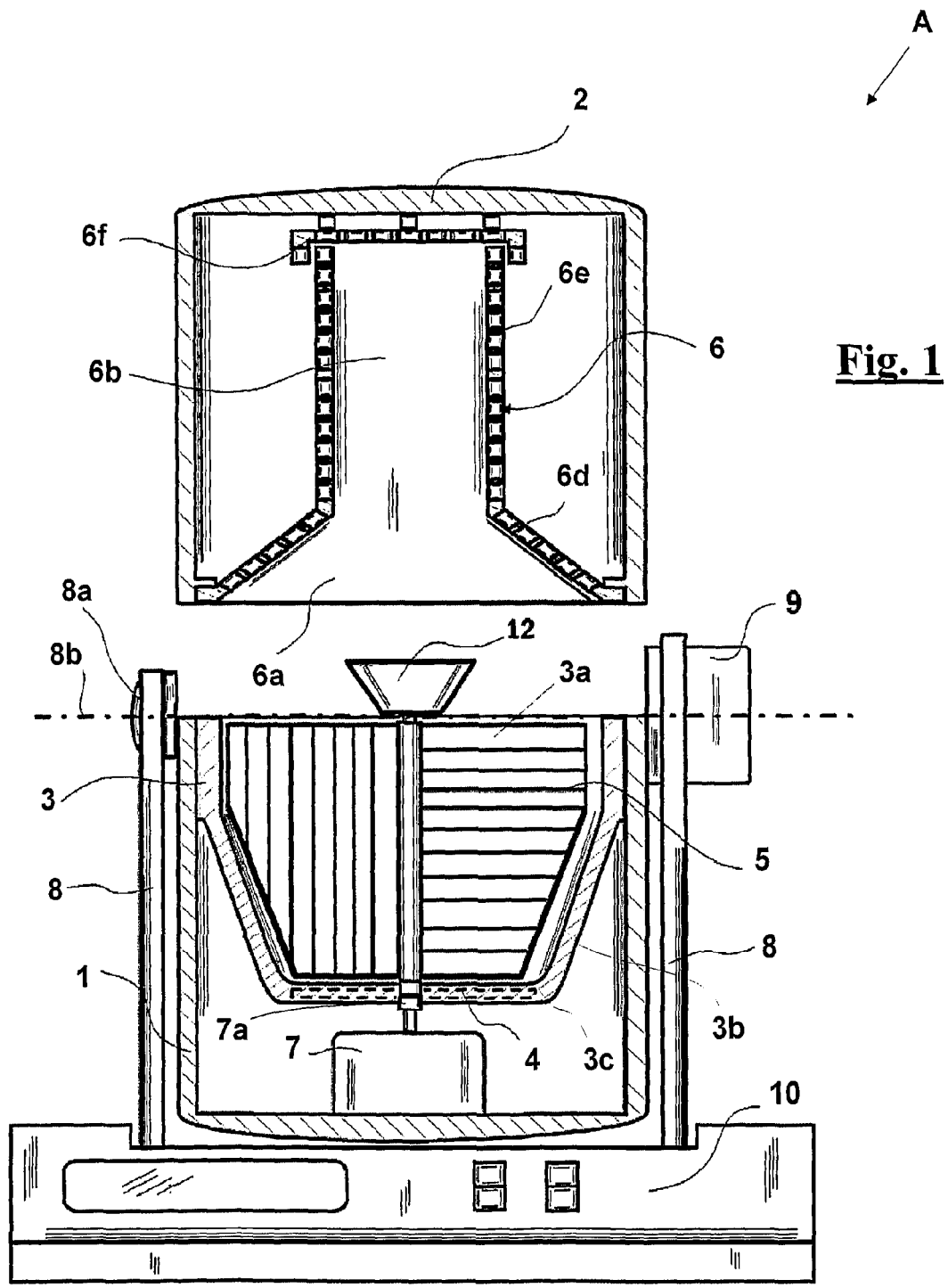
FIG. 1 shows a cross sectional view of a compact machine for making cheese, other milk-derivatives and tofu according to the invention.
Figure 20:
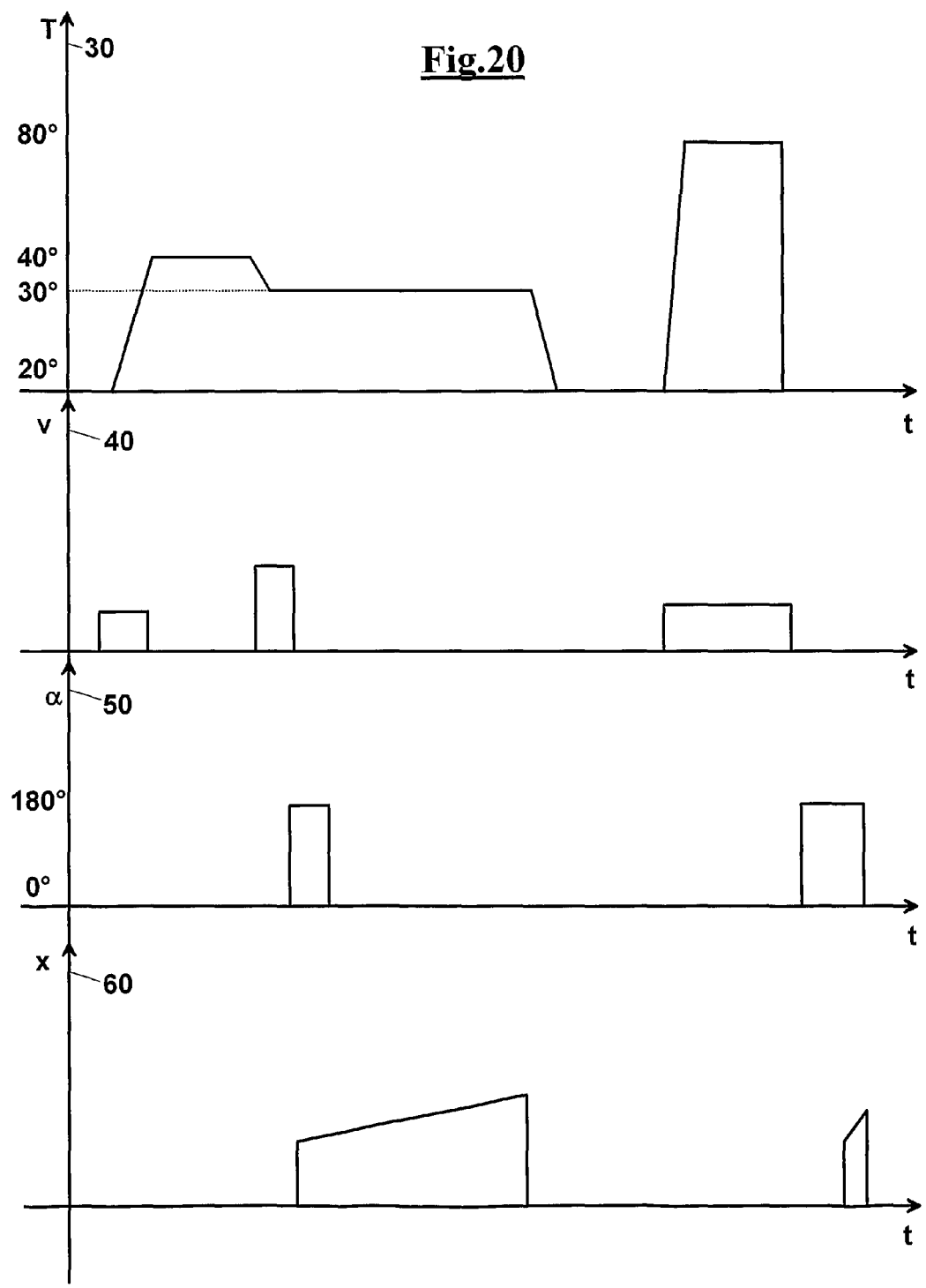
Figure 21:
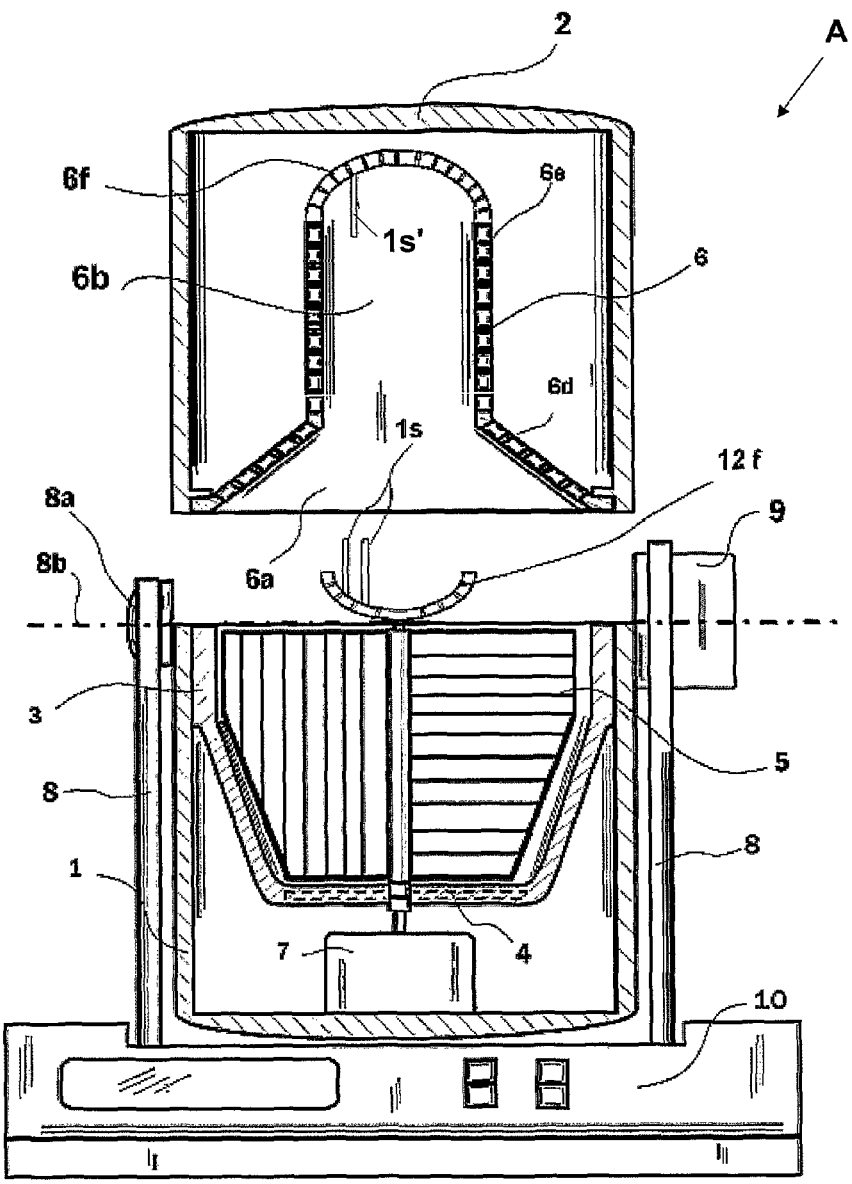
Figure 26A:
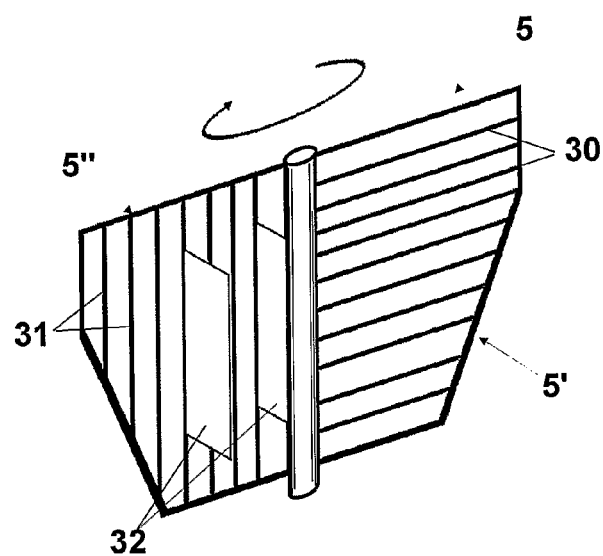
Figure 26B:
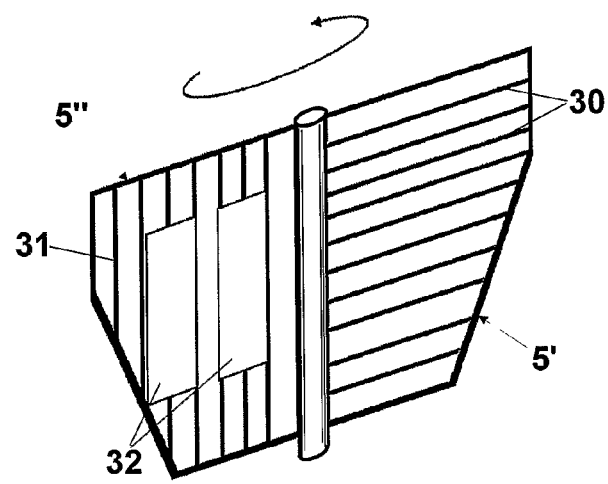
Figure 26C:
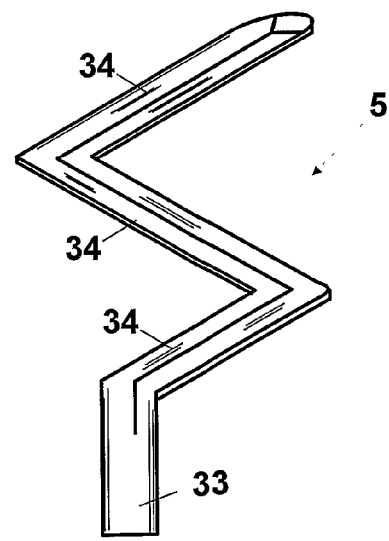
Figure 28:
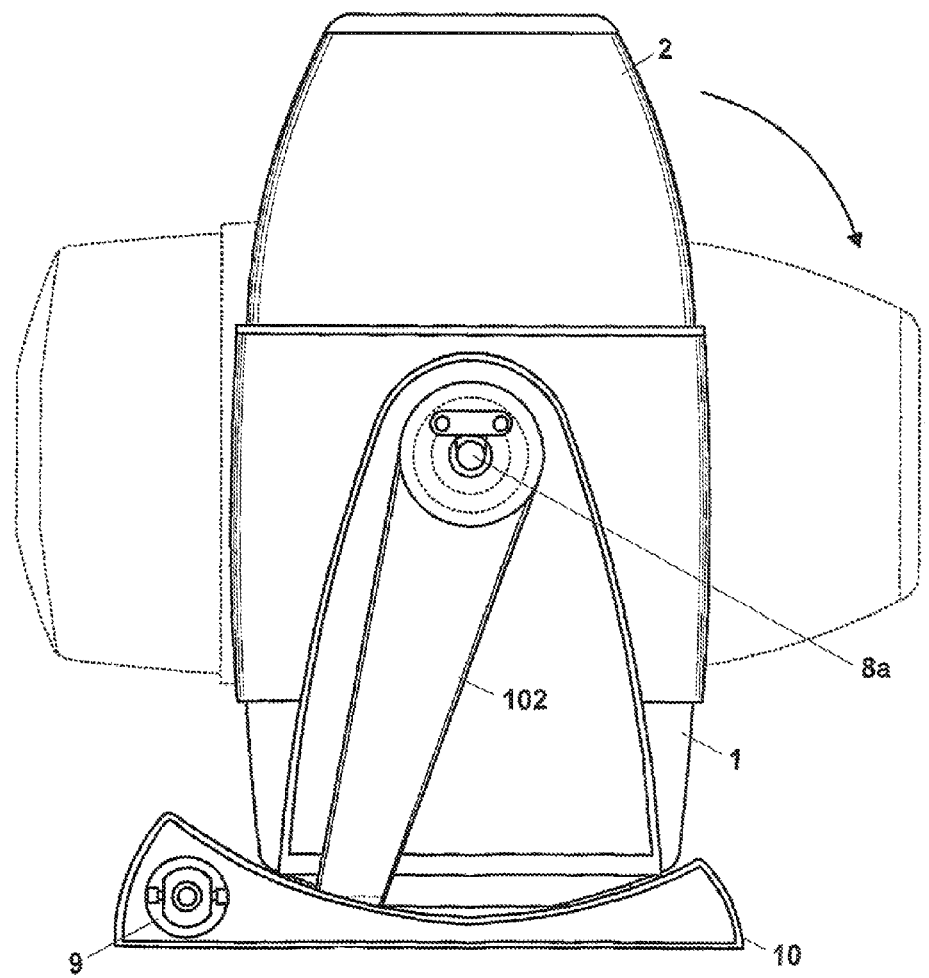

FIGS. from 5 to 13 show the succession of operations adapted to make a form of cheese or tofu;

FIGS. from 14 to 19 show the operations for making ricotta, after the steps of FIGS. from 5 to 13;

FIG. 20 shows a diagram showing some parameters of the production process versus time;

FIG. 21 shows an exemplary embodiment of the compact machine of FIG. 1 for making pasta filata cheese during a stretching step;

FIG. 22 shows a diagram similar to that of FIG. 20 that depicts some parameters of the production process for pasta filata cheese versus time;

FIGS. 23 and 24 show a cross sectional view of the shape of a container and of a basket in a possible exemplary embodiment with the relative connection means;

FIG. 25, shows a top plan view of the basin with inserted the stirring means located eccentrically;

FIGS. 26A, 26B and 26C show some exemplary embodiments of the stirring member/curd-breaker;

FIGS. 27 and 28 show respectively a cross sectional and top plan view of a possible exemplary embodiment of the compact machine, according to the invention, where the mechanisms of operation of the stirring member and the arrangement of the motors adapted to carry out the 180° rotation are shown.

DESCRIPTION OF A PREFERRED EMBODIMENT

With reference to FIG. 1, a cross sectional view is shown of a compact machine, according to the invention, for making cheese, other milk-derivatives and tofu, having a shell 1, that is comprised of a first container or impermeable basin 3, and a collecting container 2, in which a second container or permeable basket 6 is inserted for collecting the product.

More precisely, basin 3 and permeable basket 6 are open containers and are adapted to be coupled with respect to each other, in a releasable way, against each other in order to define a closed treatment chamber 20 (that is visible in FIG. 5 and following figures), that is formed respectively by a chamber 3a, that belongs to basin, and by chambers 6a and 6b, that belong to basket 6. As better shown in FIG. 3, impermeable basin 3 has a bottom wall 3c and a side wall 3b, that define workspace 3a, in which a stirring member 5 is provided.

The two coupled containers 2 and 3 are pivotally mounted on a support structure, which provides a plane base member 10 having two side arms 8 that are arranged at opposite sides with respect to the coupled containers, in order to support them during rotation.

One of the main functions of the compact machine, according to the invention, in fact, is that basin 3 and permeable basket 6 when coupled to each other are adapted to be integrally rotated, in order to be moved alternatively between a first position A (FIG. 1), where basin 3 is down and basket 6 is up, and a second position B (FIG. 2) where basket 6 is down and basin 3 is up.

Such step of rotation is permitted by the support frame, that is composed by vertical arms 8, which is pivotally connected to container 1 with a hinge 8a and with driven rotation device 9. Such a connection allows a rotation of coupled container 1 and collecting container 2, about a rotation axis 8b, from first position A to second position B (visible in FIG. 2).

In addition, the compact machine provides a motor 7, which is integral to shell 1, for operating a stirring member 5 that acts inside with a pressing member 12, visible in detail in FIGS. 3 and 3a and described below. In addition, the rotational motion of the stirring member is transmitted selectively even to the pressing element, in order to provide a stretching step for making pasta filata cheese, described below.

Furthermore, heating means 4 are provided that are adapted to heat, up to various temperatures, the treatment chamber 20 that is defined by basin 3 and basket 6.

In particular, the heating means 4 are electric resistances that are embedded in bottom wall 3c of basin 3, with possibility of being adjusted for heating to various temperatures the product, according to different production cycles. Alternatively, a resistance can be located also, or only, about walls 3b or near bottom wall 3c of impermeable basin 3.

Stirring member 5 is shown for example as a "lyre-like" curd breaker 5, i.e. a rotating frame having a plurality of strings and a rotatable central shaft 5a, which is suitable to ensure a homogeneous cut of the curd in all the points of space 3a. A further exemplary embodiment of the stirring member is shown in FIG. 26C.

In particular, stirring member 5 has a plurality of blades with a cutting profile that operate in case of a clockwise rotation, and a mixer-like profile that operates in case of a counterclockwise rotation. Therefore, when the stirring member rotates in the counterclockwise direction the blades present their mixing profile, and this is useful in the starting step, when the rennet and the bacterial cultures have to be mixed in the milk, whereas when the stirring member rotates in the other direction the blades offer the cutting profile, which is useful when the curd has to be cut into small parts.

In a way not shown, the machine may have a set of stirring members with different shape, each having a snap fit releasable connection 101 (visible in FIG. 27) in order to be inserted and/or replaced quickly, according to various operative functions, such as curd breakers, mixers, stirrers, etc.

Always in an advantageous way, stirring member 5 and the relative motor 7 are arranged in order to rotate selectively in two opposite rotation directions, either clockwise or counterclockwise, in order to provide the two functions of mixing and cutting.

As always shown in FIG. 1, basket 6 consists of a releasable bottom 6f, a cylindrical body 6e and a funnel-shaped end portion 6d, which is adapted to convey the product coming from basin 3 towards chamber 6b. More precisely, As above described, cylindrical body 6e and bottom wall 6f, that define first chamber 6b that is adapted to contain the curd, whereas the funnel-shaped end portion 6d defines second chamber 6a. Alternatively, if the rotation of the two containers is carried out in a single direction a basket can be provided having a single conical surface made on the edge where said rotation is carried out.

Structurally, cylindrical body 6e, funnel-shaped portion 6d and bottom wall 6f have through holes in order to cause the whey the pass from basket 6 to collecting container 2.

Figure 2:
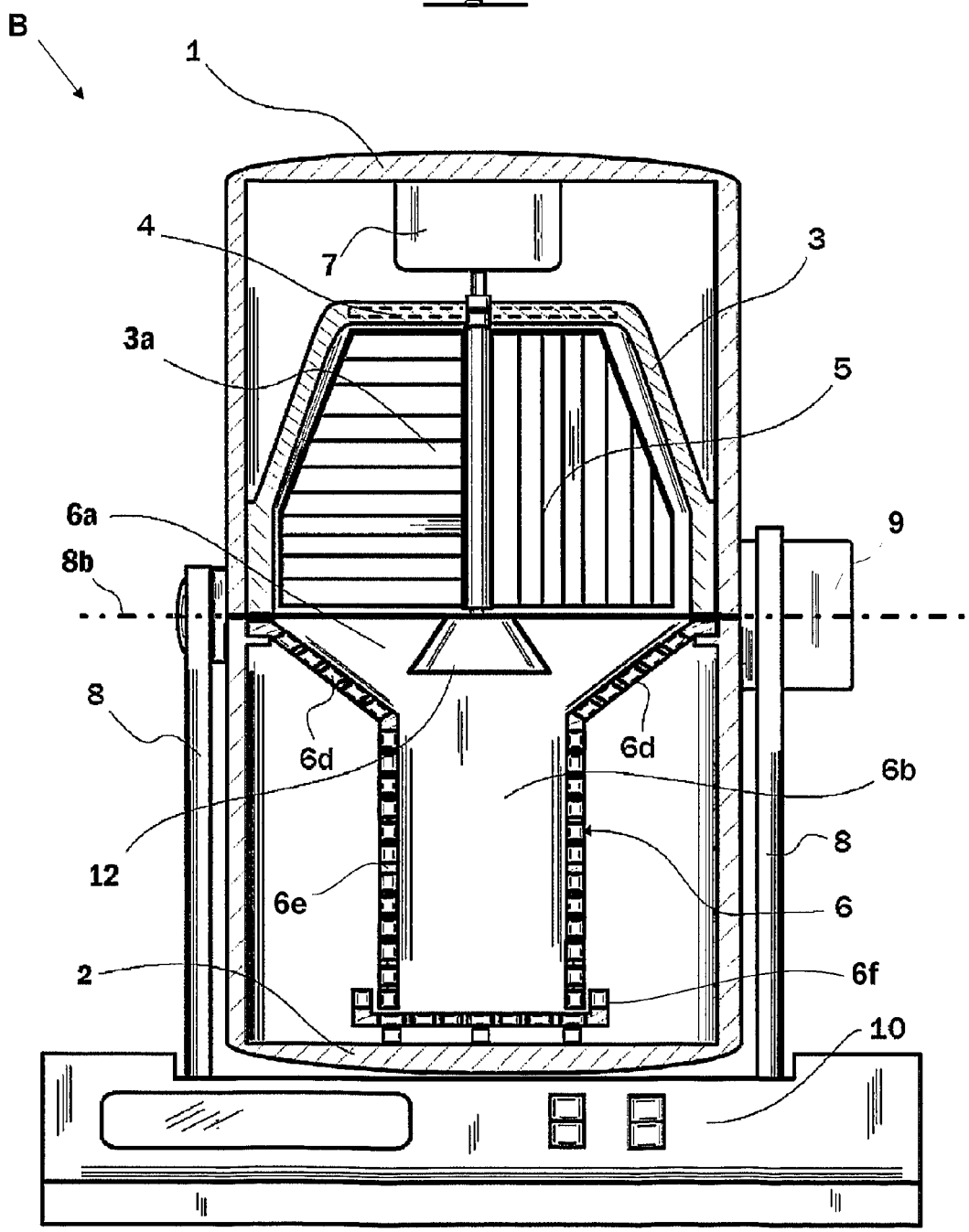
FIG. 2 shows a cross section of the compact machine for making cheese, other milk-derivatives and tofu of FIG. 1 rotated 180°.

FIG. 2 shows the compact machine for making cheese, other milk-derivatives and tofu that is rotated 180° with respect to the position of FIG. 1 such that basket 6 is below basin 3.

Figure 3A:
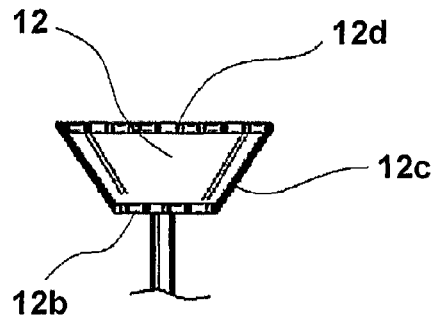
FIG. 3a shows a detailed view of the pressing means provided in the compact machine.
Figure 3:
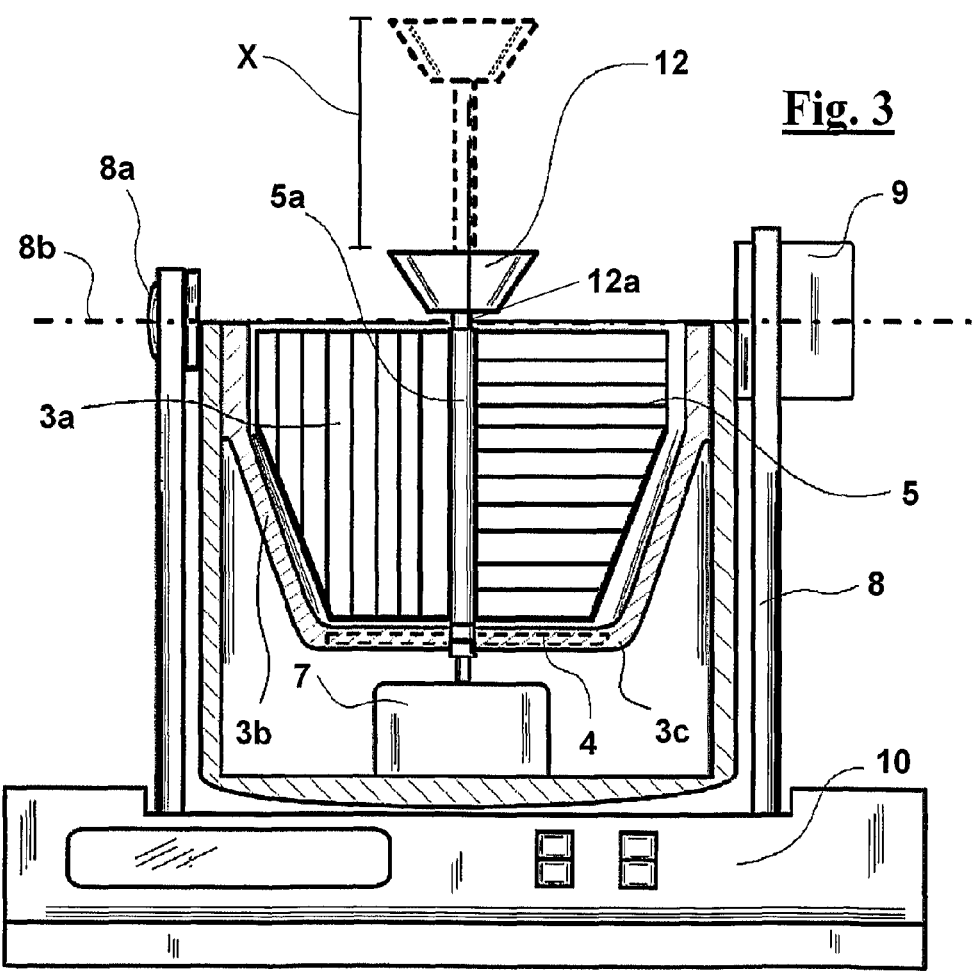
FIG. 3 shows a cross sectional view of an enlarged and detailed portion of the first container or basin of the compact machine and of the stirring means.

FIG. 3 shows an enlarged and detailed view of basin 3 that has a frustoconical shape and a flat bottom, with the possibility to be withdrawn from shell 1 and replaced according to the choice of the user. As above described, in basin 3 stirring member 5 is mounted, which has the shape of a lyre with a central joint (shown in the exemplary embodiment of FIG. 27) that is used for connection or change of the same with other types of stirring members used in different steps of the production cycle, as well as for different species of cheese. FIG. 3 shows, furthermore, a circular resistance 4 that is arranged on bottom wall 3c of basin 3, in order to heat the product following instructions that are provided for each specific product. In particular, resistance 4 allows to obtain a fixed temperature in all the points of basin 3.

In addition, a pressing member 12 is shown that is adapted to extend itself up to engage basket 6 when basin 3 and basket 6 are in position B. This way, when basin 3 and basket 6 turn back to first position A, it is avoided that the semifinished product falls away from basket 6, since it is supported by pressing means 12.

In the exemplary embodiment of FIG. 3A, pressing member 12 has a head 12*b*, a frustoconical body 12*c*, and a flat base member 12*d* oriented towards basket 6. This way, when the machine turns from first position A to second position B, the product slides against frustoconical walls 12*c* of pressing means 12 and reaches basket 6. Alternatively, the pressing member is a disc 12*f* with a concave surface (visible in FIG. 21) or a plane surface, having pins 1*s* for a stretching step of the curd. In the latter case, as above described, the disc, in addition to the pressing action, rotates also about its own axis at a predetermined speed, operated by motor 7 in order to cause the stretching step of the pasta filata cheese, described below in detail.

According to the operation cycle, pressing member 12, or 12*f*, is lowered into basket 6 by elongating shaft 12*a*, for example by means of a telescopic or screw coupling, up to cause flat base member 12*d* to engage basket 6 against the product. The flat base member, then, acts both for pressing the curd, and for supporting the product when the two containers have moved back to first position A and second container 2 is removed. Always in the particular enlarged view of FIG. 3A it is shown that both head 12*b* of pressing means 12 and flat base member 12*d* are permeable, and in particular they are grilled plates and allow the whey to drain during the pressing step.

As above described, if pressing disc 12*f* is inserted, also a stretching action is added to the pressing action, owing to the rotational motion of the disc about its own axis that is transmitted by its pins 1*s*, which are coupled to pin 1*s*' of basket 6.

Figure 4:
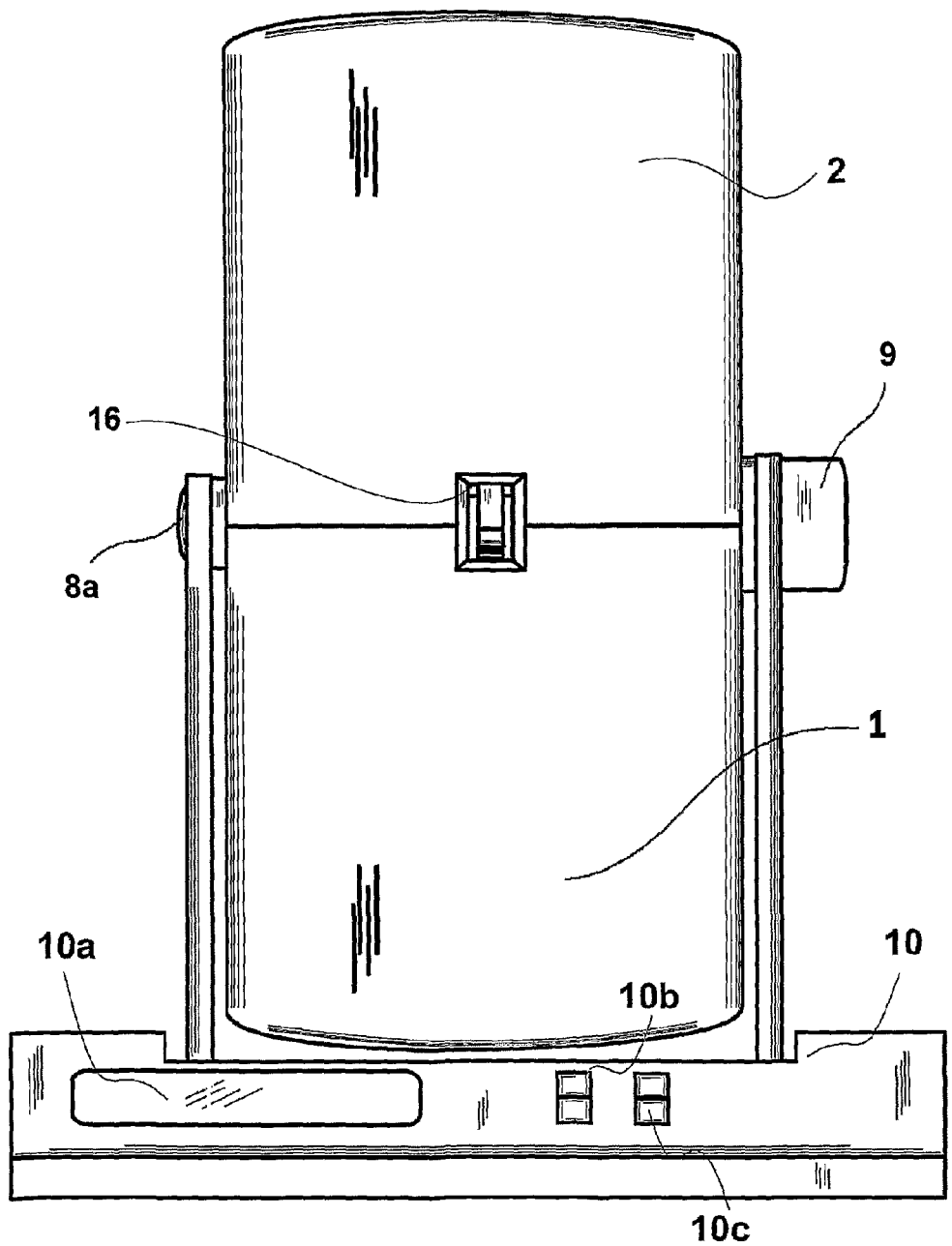
FIG. 4 shows a side view of the compact machine for making cheese, other milk-derivatives and tofu with the relative support and control means.

With reference to FIG. 4, a side view is shown of the compact machine for making cheese and other milk derivatives, in position A, is where outside shell 1 and collecting container 2 are shown coupled to each other by tight connection means 16.

For example, tight connection means 16 are hook shaped locking levers (not shown in the figures) that engage with a recess (not shown in the figures) and allow a fixed connection between shell 1 and collecting container 2. Sealing members can be provided that are arranged between the two containers to ensure a better insulation.

It is furthermore shown, in FIG. 4, that the support structure of the two coupled containers comprises a lower base member 10 having a digital display 10A that displays, in particular, the type of selected production program, or the type of product to make and/or the operations that the user must follow in the various working steps. Furthermore, monitoring sensors (not shown in the figures) can be provided that measure physical quantities such as temperature, speed of the stirring means, pH and pressure in said machine in order to provide a desired succession of operative steps. Such sensors can be, for example, associated to warning lights 10*b* and 10*c* that indicate the user when to put in the different components.

Furthermore, for the addition of rennet, bacterial inoculation or other ingredients useful for the production, shell 1 can provide, in a way not shown, an introduction mouth for loading the ingredients into basin 3. The ingredients can be contained in a capsule in a separated or premixed way. For example, rennet or citric acid can be present in a capsule to be put in the basin after a predetermined time, without opening the two containers.

FIGS. from 5 to 13 show the process for the production of a rennet-type cheese by the compact machine according to the invention.

With reference to FIG. 5, the milk 21 and the relative components, bacterial cultures and rennet (not shown in the figures) that allow the fermentation and the coagulation in basin 3, with basket 6 and the relative collecting container 2 closed above it, are shown. Basin 3 and basket 6 coupled to each other remain, in this first step, in first position A. Then, with reference always to FIG. 5, the product is mixed with stirring member 5 and heated with resistance 4, up to reaching a temperature of about 30°-40°. Stirring member 5 is then stopped for awaiting the formation of the curd (visible in FIG. 6).

With reference to FIG. 6, the step is shown where stirring member 5 rotates again in order to chop the curd into small parts 22. After that, basin 3 and basket 6 are integrally rotated to second position B, of FIG. 7, so that the product consisting of shredded curd 22 and whey 23*a* falls into basket 6 and, in particular, is guided by funnel-shaped portion 6*d* into chamber 6*b* (visible in FIGS. 1 and 2) while whey 23*a* falls below into collecting container 2.

With reference to FIG. 7, the step is shown where collecting container 2 receives whey 23*a* that has been drained from the curd. The whey filters through basket 6, filling container 2, whereas, as shown in FIG. 8, shredded curd 22 is progressively compacted in basket 6 by pressing means 12.

Figure 9:
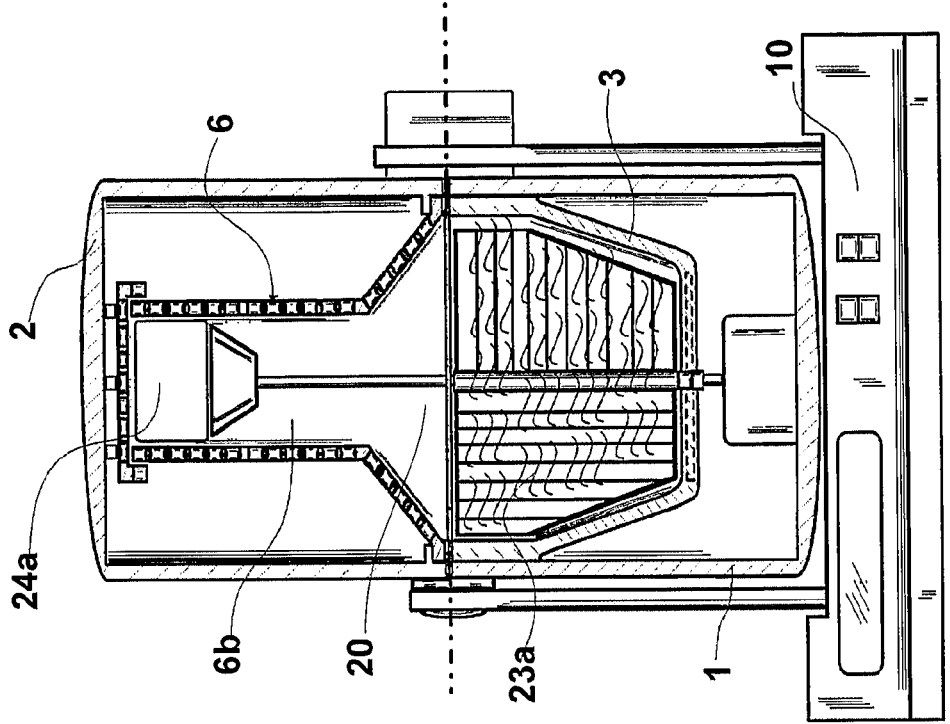

With reference to FIG. 9, the step is shown where basin 3 and basket 6 are rotated back to first position A, and whey 23*a* that was present in collecting container 2 falls into basin 3 passing through the holes of basket 6. At the same time compacted curd 24*a* remains in basket 6 supported by pressing means 12 in chamber 6*b* of basket 6. Simultaneously, heating means 4 is turned on that heats all the chamber defined within the two containers up to the temperature of about 35° C., causing the product to "dry-out".

Figure 10:
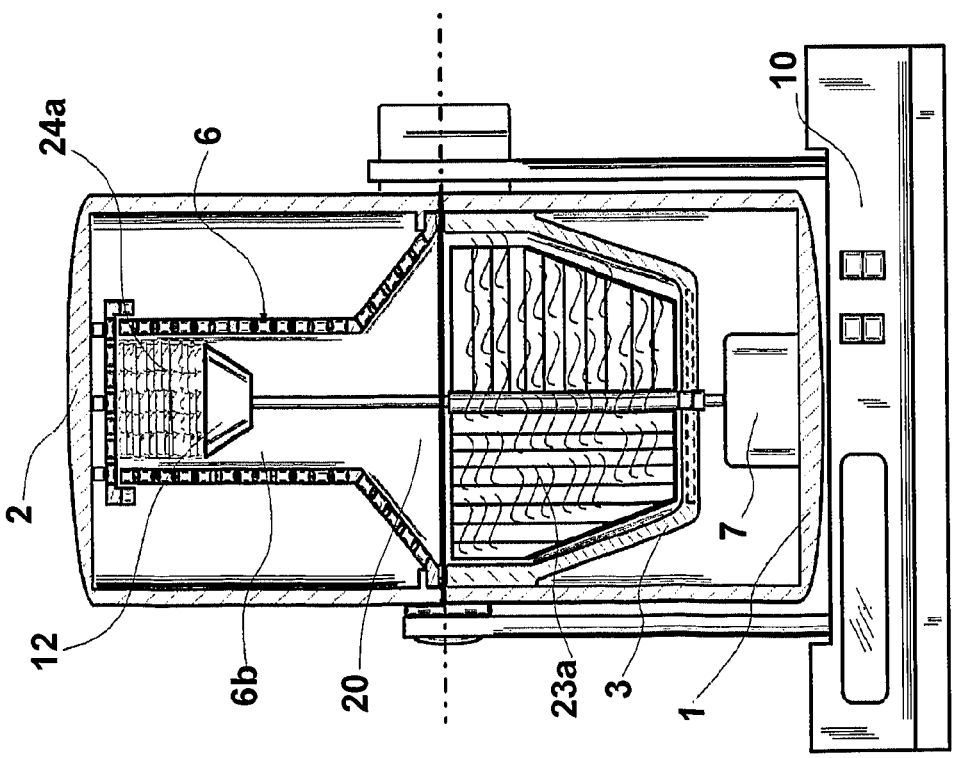

In FIG. 10 a step is shown of further compaction of the product 24*a* while drying-out.

Figure 15:
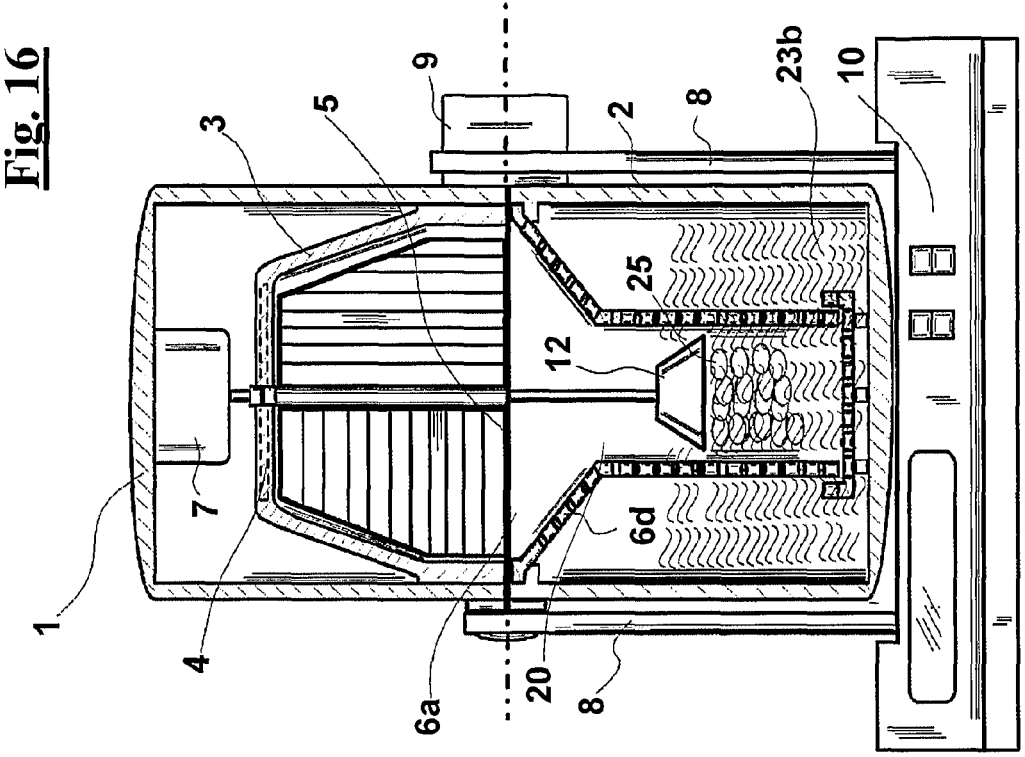

With reference to FIG. 11 the successive step is shown where the product, once ended the drying-out phase, is already an actual cheese 24*b*, and it is removed from collecting container 2. In FIG. 12 the step is shown where the bottom of basket 6*f* is removed, whereas in FIG. 13 the machine is shown in which also basket 6 has been removed. Then, cheese 24*b* is ready and, while supported by pressing means 12, it can be taken by the user. FIGS. from 14 to 21 show, after the above described operations, the possibility of making ricotta 25 (visible in FIG. 15) starting from whey 23*a*, just produced.

Figure 16:
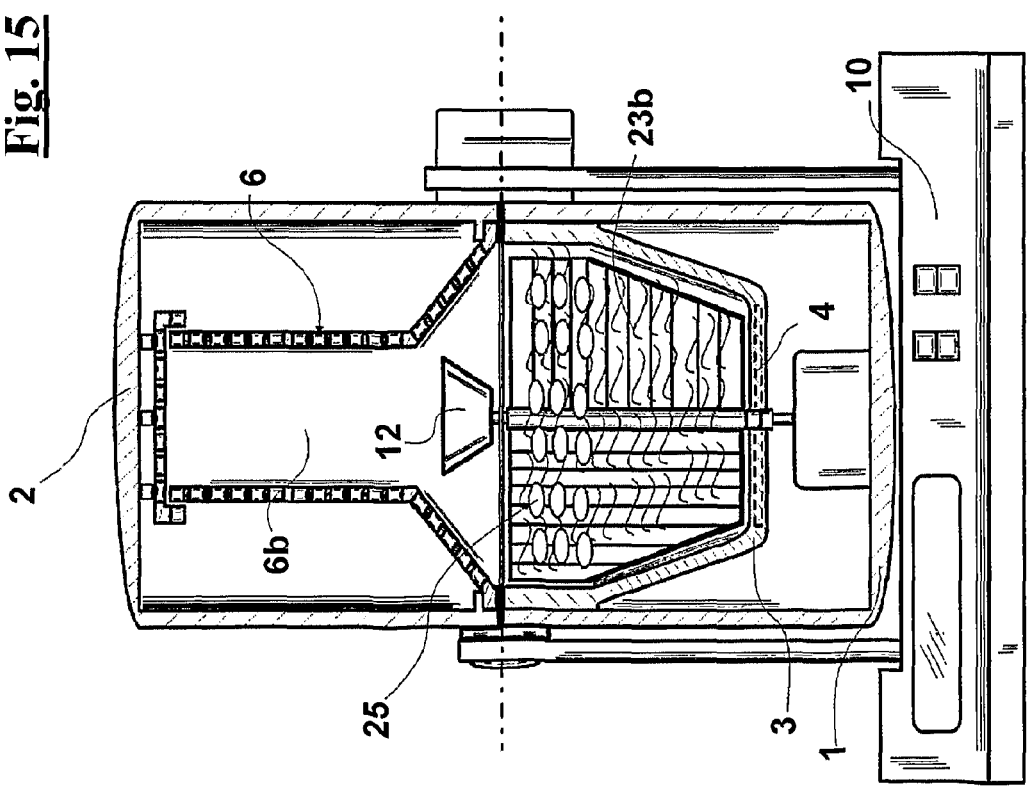

In particular, with reference to FIG. 14, whey 23*a* is shown in basin 3 with the two containers closed again integrally in first position A. After turning on again resistance 4 and heating whey 23*a* up to 80-90° for a determined time, ricotta 25 is formed in basin 3, as visible in FIG. 15, which coagulates and frees a lighter whey 23*b*. After that, as depicted in FIG. 16, basin 3 and basket 6 coupled to each other are again integrally rotated to second position B, so that the product consisting of ricotta 25 and light whey 23*b* falls into basket 6 and, in particular, like in the previous case, ricotta 25 falls into basket 6 whereas light whey 23*b* is drained into collecting container 2.

Figure 19:
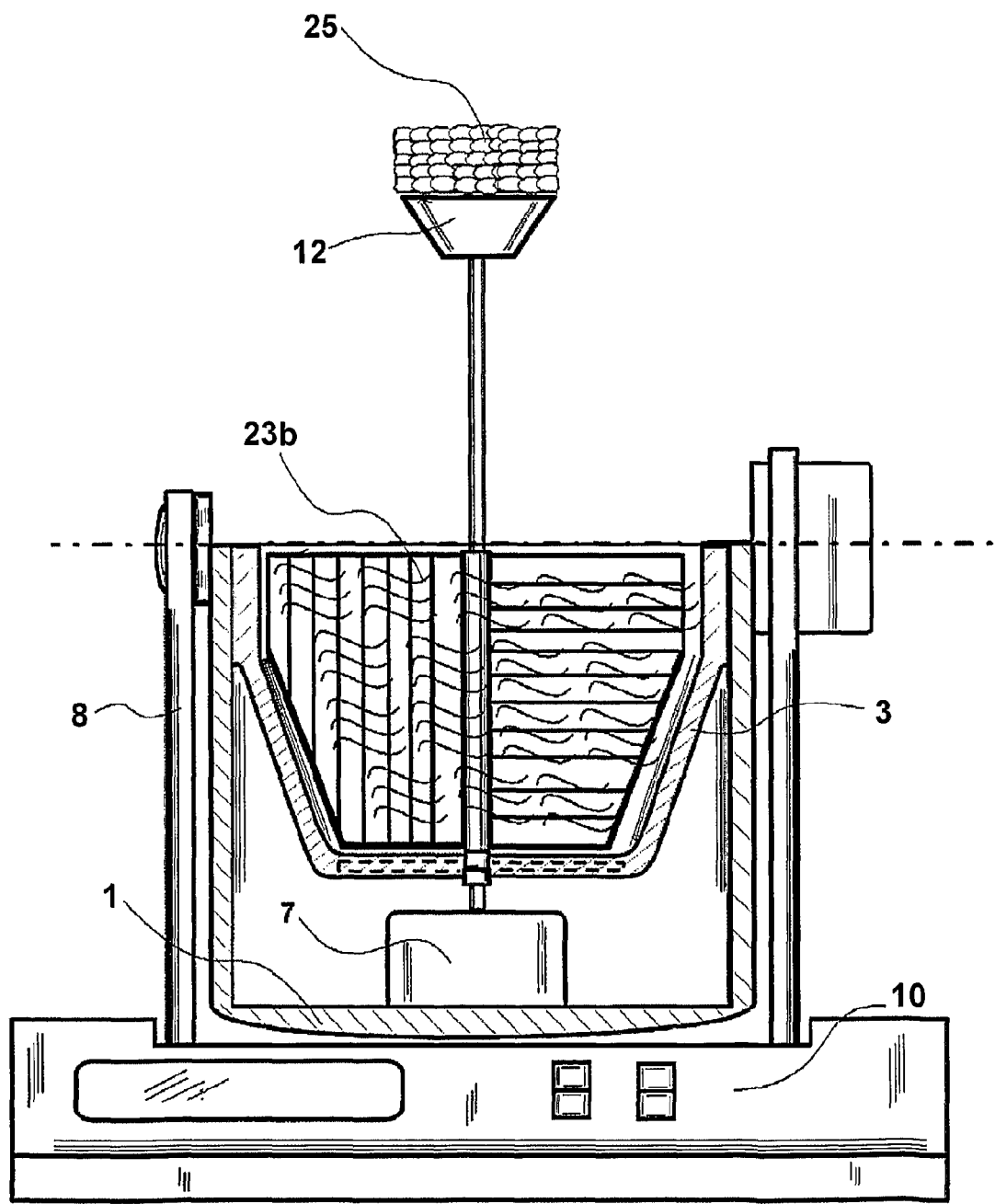

Then, owing to the machine first position A, as shown in FIG. 17, ricotta 25 that is present in basket 6 is compacted by pressing means 12. Then, as shown in FIGS. 18 and 19, the ricotta can be taken, after removing the bottom of basket 6*f* and of basket 6. Light whey 23*b* that is accumulated in basin 3 is drawn away for being eliminated or reused, and the machine is ready, after washing, for a new production cycle.

Always in an advantageous way, a program of automatic washing can be provided such that, after having inserted water and detergent in basin 3 and closed again the two containers, the machine heats the solution, operates the stirring member and carries out different tilting cycles from the first to the second position.

According to another possible embodiment of the process (not visible in the figures) that can be carried out through the compact machine for making cheese, other milk-derivatives and tofu, the production of pasta filata cheese, for example mozzarella is described.

The production cycle starts arranging the ingredients in basin 3 and, in particular, according to a selected recipe, milk, cream, calcium chloride, rennet and citric acid. The ingredients are mixed for some minutes by stirring means 5 and then resistance 4 is operated, which heats the content to about 35° C. After a stay of about 15 minutes, to curd is formed, and stirring means 5 is operated again in the other rotation direction, for cutting the curd. After that, basin 3 and basket 6 coupled to each other are again integrally rotated to second position B, so that the product consisting of the curd and the whey falls into basket 6 and, in particular, is guided by the funnel-shaped portion 6d into chamber 6b of permeable basket 6. Some minutes later, basin 3 and the second container coupled to each other are rotated again to first position A; the curd, supported by pressing means 12 remains in basket 6, while the whey falls into basin 3. The successive step relates to the stretching process that affects the consistency of the final product. The whey present in basin 3, is subject to heating up to reaching a temperature of about 80°-90° C. Then, basin 3 and the second container coupled to each other are rotated to second position B, and the hot whey, falling again, soaks the curd present in basket 6 and remains into contact with the curd for a time of about 10-15 minutes. Finally, basin 3 and basket 6 coupled to each other are integrally rotated back to first position A. Then, the automatic mechanism of "stretching" is operated. In particular, the rotation is operated of special pressing means 12f having pins 1s (shown in FIG. 21), which, by cooperating with pin 1s' mounted on the bottom of basket 6, create a stretching space through which the product passes and is stretched.

Alternatively, the curd can be taken by the user for being worked by hand, and then put again into basket 6 to repeat the succession of the steps "immersion of the curd in hot whey and then stretching the curd" for many times up to achieve a desired consistency.

With reference to FIG. 20 a time diagram is shown that shows the course of the many parameters responsive to time. In particular, in y-coordinates 30 the course is shown of the temperature in basin 3 where the product in work is located. In the second y-coordinates 40 the speed is shown of the stirring member responsive to time; the graphical representation shows then the time during which the stirring member remains in function during the production steps. The third y-coordinates 50 show, instead, the steps of tilting the two containers from first position A to second position B and vice-versa during the production process. Finally, in the last y-coordinates 60 the movement X is shown (visible in FIG. 3) of the pressing means during the various steps.

Figure 21A:
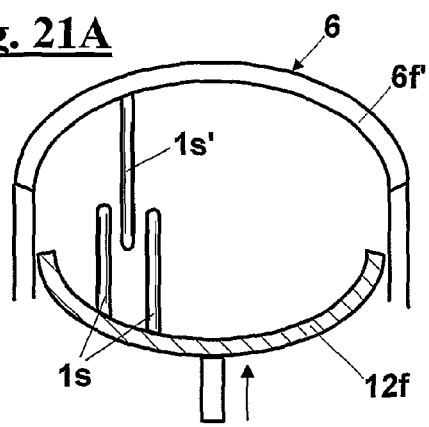
Figure 21B:
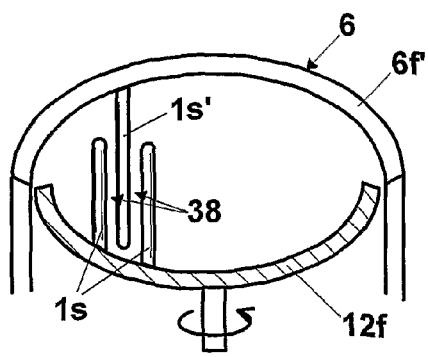

With reference to FIG. 21 and to the enlarged view of FIGS. 21A and 21B, an exemplary embodiment is shown of the compact machine, which differs from the above described machine of FIG. 1 in the shape of pressing means 12f, which have a concave surface as well as in the shape of basket 6, which is also made with a concave bottom 6f', opposite to the concavity of pressing disc 12f. In this exemplary embodiment, pressing means 12f add to the function of pressing the curd also the function of stretching, which is obtained by means of stretching pins that are arranged on the pressing disc and on collecting basket 6. In particular, two pins 1s are mounted suitably distant from each other on the pressing disc 12f and a pin 1s' is arranged on the bottom of basket 6 is such that pin 1s' cooperates with pins 1s (FIGS. 21A and 21B) creating gaps 38 that are adapted to stretch the semifinished product present in the machine. More precisely, by passing through gaps 38 the cheese is subject to a mechanical stretching action that in combination with the step of soaking in the hot whey causes the production of the desired consistency.

The diagram of FIG. 22 represents, like that of FIG. 20, the functional parameters of the machine in case of the production of pasta filata cheese.

Like in the previous case, the y-coordinates 30 shows the course of the temperature in basin 3 where the product is put, whereas in the y-coordinates 40 the stirring means and its speed responsive to time are shown. The y-coordinates 50 instead show the phases of tilting the two containers from first position A to second position B whereas the y-coordinates 60 represent the movement X (visible in FIG. 3) of the pressing means during the various steps. In addition, with respect to the graphic representation of FIG. 20, the y-coordinates 70 are responsive to the speed and to the time in which the stretching pins of the cheese act, which are mounted integral to pressing member 12f, as visible in FIG. 21.

Another type of process (not shown in the figures) relates to the production of butter. Once put in basin 3, the cream and special bacterial inoculation are mixed by the stirring means 5. Then, resistance 4 is activated, which raises the temperature of the product up to about 25° C. and keeps it for a determined time. Then, resistance 4 is turned off and cold water may be added into basin 3, after removal of the second container. Then, in case the latter step is carried out, the second container is put again to close the basin, and operated again stirring means 5 at high speed, and at the same time repeated rotations are carried out of the first and of the second container coupled to each other from first position A to second position B and vive-versa, in order to "hit" energetically the product ("butter making"). After the necessary cycle time, depending upon the type of cream used and the working temperature, the fat part of the cream forms granules of butter that are ready to be eaten.

A further example of product that is obtainable by the compact machine, according to the invention is tofu. In particular, as known, tofu is produced by means of soy milk, i.e. an extracted aqueous derivative from the soy beans, and a coagulating agent for making coagulation (such as anhydrous calcium sulphate, or citric acid).

The production steps are the following: the soy milk is put in basin 1, stirred by curd breakers 5, and heated by resistance 4 up to the temperature of about 85° C. Then, the anhydrous calcium sulphate is added and in the meantime the curd breakers are stopped. A stay of some minutes follows, for example 5-10 minutes, with subsequent coagulation. Then, curd breakers 5 are operated that carry out the break of the curd. Then, the machine is tilted 180° and the pressing means is operated, which engages basket 6 in order to keep the semifinished product pressed, and a few instants later the machine carries out a second tilting 180°, back to the starting position. The semifinished product is then pressed for some minutes, about 20-40 minutes, at the end of which the product is ready for being taken by the user.

Finally as further example the production is shown of "flakes of cheese" i.e. cheese type "cottage" and fresh soft cheese, like "quark".

The steps for making the first kind provide the introduction in the machine of the milk with the necessary agents, such as inoculation and rennet and in the meantime the means for mixing is operated for some minutes. Resistance 4 of the machine heat the product to about 33° C., and once stayed to achieve a suitable consistency/ripening of the curd (for example after about 1 hour), the "break" is made of the latter by curd breakers 5. The curd thus obtained is left to stay for about 10-15 minutes. Then, the "cooking" step is carried out with slow stirring by curd breakers 5 and heating gradually to a temperature of about 50-55° C. This step can last even for some hours up to the formation of the "flakes". At this point, the machine carries out a first tilting 180°, followed by a second tilting 180° back to the starting position. This way the curd is separated, i.e. the "flakes", from the whey.

Finally, the flakes thus obtained are put in cold water and cooled and then is a "dressing" is added, for example, salted cream.

In case instead of fresh soft cheese, like "Quark" cheese, the steps provide the introduction of the milk, of the salt, and of the many agents in collecting container 1, and also in this case the means for mixing are operated for some minutes. The whole is heated up to about 30° C. and stayed, even for some hours, always with the heating system that is turned on. At this point, the machine carries out a first tilting 180°, running to position B, then immediately a second tilting 180°, back to position A, and then stayed in the latter position, such that the semifinished product drains the whey surplus. After a time necessary to ripening, even some hours, the cheese is ready for being extracted and eaten.

With reference to FIGS. 23 and 24 a permeable basket 6' is shown, which is engaged with a collecting container 2' and can be removed and replaced with another basket that has a different shape, according to the different needs of production. For example basket 6' can be made in different ways with respective mesh sizes and shapes to achieve a desired filtering rate of the whey of the cheese. In particular, the walls of the basket may have a specific pattern that is adapted to give the cheese a desired final aspect. For example, can be achieved forms of raw cheese, or ricotta.

With reference to FIG. 25, a top plan view is shown of basin 3. In particular, to avoid that, in the cutting step, the curd rotates with the stirring member 5, thus hindering the cutting step same, basin 3 and relative shaft 5a of lyre 5 are arranged with rotation axis decentred with respect to the centre of basin 3;

FIGS. 26A and 26B show lyre 5, made according to a preferred exemplary embodiment, which comprises two leaves 5' and 5" respectively having stretched strings in a horizontal direction 30 and in a vertical direction 31, which allow to cut cube-shaped small blocks of curd.

Furthermore, lyre 5 comprises two plates 32 that, according to the direction of rotation of the same, are open or are closed such that, in the former case, the product is mixed, and, in the latter case, the curd is cut by horizontal strings 30 and vertical strings 31, as above described.

In FIG. 26C instead a further kind of stirring member 5 is shown with oblique mixing surfaces 34 such that when tilting they assist the descent of the curd and do not hold back any amount of product. Even in this case, the stirring member is arranged with a snap fit engagement end 33 in order to be replaced quickly.

FIG. 27 shows a cross sectional view of the compact machine, according to an advantageous exemplary embodiment, that shows the encumbrance and the arrangement the many mechanical parts. In particular, the motor 7 that operates stirring member 5 is arranged decentred with respect to the axis and transmits the movement through mechanism 100, whereas resistance 4 is located near the bottom of the container 3 about the side walls 3b. In addition the snap fit mechanism 101 is shown for replacing easily the many types of stirring members 5, responsive to the product type.

Finally, as shown in FIG. 28, motor 9 is adapted to cause the machine to rotate from the actual position A to position B by a belt 102, and is arranged on base member 10 and connected to pins 8A that support the compact machine.

In a possible embodiment of the invention one of said motors, 7 or 9, as well as an additional motor, in the steps of FIG. 7 or of FIG. 16, can cause a vibration (not shown in the drawings) that assists the descent of the curd from basin 3 to permeable basket 6 and also assists full completion of the descent and a first compaction, before that pressing means 12, if provided, complete the compaction.

The foregoing description of a specific embodiment will so fully reveal the invention according to the conceptual point of view, so that others, by applying current knowledge, will be able to modify and/or adapt for various applications such an embodiment without further research and without parting from the invention, and it is therefore to be understood that such adaptations and modifications will have to be considered as equivalent to the specific embodiment. The means and the materials to realise the different functions described herein could have a different nature without, for this reason, departing from the field of the invention. It is to be understood that the phraseology or terminology employed herein is for the purpose of description and not of limitation.

The invention claimed is:

1. A compact machine for making cheese, other milk-derivatives and tofu comprising:
   a first open container coupled to a second open container, said coupled first and second containers defining a treatment chamber, wherein:
   said first container comprises an impermeable basin having a bottom wall and a side wall that define together a workspace, as well as a stirring means acting in said workspace and a heating means that is adapted to heat said bottom wall and/or said side wall;
   said second container comprises a permeable basket having at least one conical surface that is adapted to convey into said basket a product coming from said basin; and
   wherein said coupled first and second containers are adapted to be integrally rotated, in order to be moved alternatively between a first position, where said basin is down and said basket is up, and a second position, where said basket is down and said basin is up.

2. A compact machine, according to claim 1, wherein said basket has a funnel-shaped end portion.

3. A compact machine, according to claim 1, wherein a whey collecting container is provided for collecting whey expelled from the product and filtered through said permeable basket when said coupled first and second containers are in said second position, said collecting container being integral to the second container and allowing the whey to fall back into the first container when said coupled first and second container turn back to said first position.

4. A compact machine, according to claim 1, wherein a pressing means is provided for pressing the product in said first container by extending from said first container up to engage said basket when said coupled first and second containers are in the second position.

5. A compact machine, according to claim 4, wherein said pressing means have a conical head, with a flat base member that is oriented towards said basket.

6. A compact machine, according to claim 4, wherein said pressing means are selected from the group comprised of: a plane surface disc or a concave surface disc, oriented towards said basket.

7. A compact machine, according to claim 6, wherein said concave surface disc is used with a respective basket with concave bottom in order to define a round space.

8. A compact machine, according to claim 6, wherein said disc rotates about its own axis at a predetermined speed and has on said plane surface or said concave surface one or more pins that are adapted to be coupled, when said pressing element extends towards said basket, with one or more pins mounted on the bottom of said basket in order to form a stretching space through which the product passes for making pasta filata cheese.

9. A compact machine, according to claim 1, wherein a permeable basket is provided that can be removed and replaced with another basket that has a different shape when needed according to a desired product.

10. A compact machine, according to claim 9, wherein said basket can be made in different ways with respective mesh sizes and shapes to achieve a desired filtering rate of the product that crosses it.

11. A compact machine, according to claim 9, wherein the walls of the basket may have a specific pattern that is adapted to give the cheese a desired final aspect.

12. A compact machine, according to claim 1, wherein said stirring means may have profiles and shapes that are variable depending upon different operations to carry out in the different working steps and/or for various types of product.

13. A compact machine, according to claim 1, wherein said machine has a set of stirring means having a snap fit connection in order to be inserted and/or replaced quickly, according to the various functions such as curd breakers, mixers, stirrers, stretchers, etc.

14. A compact machine, according to claim 1, wherein a support structure is provided of the two coupled containers comprising a plane base member having two side arms.

15. A compact machine, according to claim 14, wherein said arms are arranged at opposite sides with respect to said coupled containers, in order to support them during rotation.

16. A compact machine, according to claim 14, wherein said arms are associated with a motor that drives automatically the rotation of the two coupled containers.

17. A compact machine, according to claim 1, wherein the first container is enclosed in a shell containing a motor, wherein said motor is integral to the shell and is configured to operate the stirring means.

18. A compact machine, according to claim 17, wherein said motor can also be fixed on the base member out of the shell and/or the first container.

19. A compact machine, according to claim 1, wherein said stirring means and the motor are arranged in order to rotate selectively in two opposite rotation directions, in particular said stirring means having blades with a cutting profile in one of the two rotation directions and with a mixer-like profile in the other one of the two rotation directions.

20. A compact machine, according to claim 1, wherein said machine has a digital display, in particular said display showing the type of program that has been selected or the type of product to make as well as the operations that the user must follow in the various working steps.

21. A compact machine, according to claim 1, wherein said machine comprises at least one motor that causes a vibration that assists the descent of the curd from said basin into said permeable basket.

* * * * *